(12) United States Patent
Nanda et al.

(10) Patent No.: US 12,056,514 B2
(45) Date of Patent: Aug. 6, 2024

(54) VIRTUALIZATION ENGINE FOR VIRTUALIZATION OPERATIONS IN A VIRTUALIZATION SYSTEM

(71) Applicant: MICROSOFT TECHNOLOGY LICENSING, LLC, Redmond, WA (US)

(72) Inventors: Bijayalaxmi Nanda, Edison, NJ (US); Somesh Goel, Newcastle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 481 days.

(21) Appl. No.: 17/362,786

(22) Filed: Jun. 29, 2021

(65) Prior Publication Data

US 2022/0413888 A1 Dec. 29, 2022

(51) Int. Cl.
*G06F 9/455* (2018.01)
*G06F 12/084* (2016.01)

(52) U.S. Cl.
CPC ........ *G06F 9/45558* (2013.01); *G06F 12/084* (2013.01); *G06F 2009/45575* (2013.01); *G06F 2212/152* (2013.01)

(58) Field of Classification Search
None
See application file for complete search history.

(56) References Cited

U.S. PATENT DOCUMENTS

| 8,635,395 | B2 | 1/2014 | Colbert |
| 8,819,660 | B2 | 8/2014 | Fries et al. |
| 9,104,469 | B2 | 8/2015 | Bajaj et al. |
| 9,619,268 | B2 | 4/2017 | Beveridge et al. |
| 9,971,616 | B2 | 5/2018 | Kaul |
| 10,528,116 | B2 | 1/2020 | Murphy et al. |
| 10,795,708 | B1 | 10/2020 | Grechishkin et al. |

(Continued)

FOREIGN PATENT DOCUMENTS

WO 2013023090 A2 2/2013

OTHER PUBLICATIONS

"Suspending and Resuming an Instance", Retrieved From: https://cloud.google.com/compute/docs/instances/suspend-resume-instance, Mar. 17, 2021, 10 Pages.

(Continued)

*Primary Examiner* — Qing Yuan Wu
(74) *Attorney, Agent, or Firm* — Shook, Hardy & Bacon L.L.P.

(57) ABSTRACT

Methods, systems, and computer storage media for providing virtualization operations—including an activate operation, suspend operation, and resume operation for virtualization in a virtualization system. In operation, a unique identifier and file metadata associated with a first file stored in a cache engine. The cache engine manages the first file of an application running on the virtual machine to circumvent writing file data of the first file to an OS disk during a suspend operation of the virtual machine and circumvents reading file data of the first file from the OS disk during a resume operation of the virtual machine. Based on a resume operation associated with the virtual machine and the file metadata, file data of the first file that is stored in the cache engine is accessed. The file data is communicated to the virtual machine, the virtual machine is associated with the suspend and the resume operation.

20 Claims, 12 Drawing Sheets

(56) References Cited

U.S. PATENT DOCUMENTS

| | | |
|---|---|---|
| 2010/0023942 A1 | 1/2010 | Sheu et al. |
| 2010/0070678 A1 | 3/2010 | Zhang et al. |
| 2012/0272236 A1 | 10/2012 | Baron |
| 2014/0173196 A1 | 6/2014 | Beveridge et al. |
| 2014/0173213 A1* | 6/2014 | Beveridge ............ G06F 9/4856 711/130 |

OTHER PUBLICATIONS

Caceres, et al., "Reincarnating PCs with Portable SoulPads", In Proceedings of the 3rd International onference on Mobile Systems, Applications, and Services, Jun. 6, 2005, 14 Pages.

Cooley, et al., "Hyper-V Architecture", Retrieved From: https://docs.microsoft.com/en-us/virtualization/hyper-v-on-windows/reference/hyper-v-architecture, Jan. 11, 2018, 4 Pages.

Cooley, et al., "Hyper-V Integration Services", Retrieved From: https://docs.microsoft.com/en-us/virtualization/hyper-v-on-windows/reference/integration-services, May 25, 2016, 7 Pages.

Park, et al., "Fast and Space-Efficient Virtual Machine Checkpointing", In Proceedings of the 7th ACM SIGPLAN/SIGOPS International Conference on Virtual Execution Environments, Mar. 9, 2011, pp. 75-85.

Tolia, et al., "Integrating Portable and Distributed Storage", In Proceedings of the 3rd USENIX Conference on File and Storage Technologies, vol. 4, Mach, 2004, 20 Pages.

"International Search Report and Written Opinion Issued in PCT Patent Application No. PCT/US22/030457", Mailed Date: Aug. 12, 2022, 13 Pages.

\* cited by examiner

VIRTUALIZATION ENGINE FOR VIRTUALIZATION OPERATIONS IN A VIRTUALIZATION SYSTEM

BACKGROUND

Users rely on applications and services to perform computing tasks. Distributed computing systems (e.g., cloud computing platforms) host applications and services using computing architectures that support network access to a shared pool of configurable computing and storage resources. A virtualization system of a cloud computing platform provides an operating environment that supports customer workloads and cloud computing objects (e.g., user account, applications, and services) that are part of a software and hardware architecture of the cloud computing platform. For example, desktop virtualization (or Desktop-as-a-Service "DaaS") technology supports providing a comprehensive desktop environment for a highly flexible and secure desktop delivery model.

Conventionally, virtualization systems are not configured with computing logic and shared virtualization services for delivering virtual environments in cloud computing platforms. For example, a virtual machine—associated with a virtual desktop—is implemented with a classic deployment model primarily designed for traditional customer workloads and configurations. Virtualization operations for classic deployment models do not adequately address functionality needed to support virtual machines to ensure adequate performance of virtual desktop environments. As such, a more comprehensive virtualization system—with an alternative basis for performing virtualization operations—can improve computing operations and interfaces for virtualization systems in cloud computing platforms.

SUMMARY

Various aspects of the technology described herein are generally directed to systems, methods, and computer storage media, for among other things, providing virtualization operations—including an activate operation, suspend operation, and resume operation for virtualization management in a virtualization system. A virtualization operation is an operation that is executed to accomplish a particular task (e.g., activate, suspend, or resume) associated with a virtual machine. An activate operation, suspend operation, or resume operation is executed for a virtual machine based on a cache engine. The cache engine manages (e.g., stores and communicates) a first file and file data of the first file of an application running the virtual machine. Managing the first file and the file data helps circumvent writing file data of the first file to an operating system disk during a suspend operation of the virtual machine and helps circumvent reading file data of the first file from the operating system disk during a resume operation of the virtual machine. The first file is maintained in the cache engine as a single instance of the first file that is accessible by a plurality of virtual machines (i.e., guest virtual machines) associated with a host machine. The first file is retrieved from an operating system disk and stored in the cache engine using a unique identifier and cache index. The unique identifier and cache index support performing virtualization operations. The cache index includes a plurality of application files (e.g., application files of different types of applications in an operating system disk) that are managed when the applications are running on the virtual machine or a plurality of other virtual machines.

Conventionally, virtualization systems are not configured with computing logic for shared virtualization services associated with delivering virtual desktops in cloud computing platforms. A technical solution—to the limitations of conventional virtualization system operations—provides virtualization operations—including an activate operation, suspend operation, and resume operation for virtualization management in a virtualization system. A software program (e.g., Operating System "OS" program or application program)—referred to herein collectively as "application" can be identified for a computing logic that supports shared virtualization management, where a plurality of application files (e.g., a first file and a second file) support running the application on virtual machines (e.g., virtual machines associated with virtual desktops). A host machine (e.g., a hypervisor server) maintains the plurality of application files (e.g., read-only files or binaries) in a cache engine (running a cache index) on the host machine. A virtual machine (e.g., a guest virtual machine) on the host machine may retrieve the plurality of application files to support running the application. A first file and second file support running the application, where the first file is in virtual memory as part of the running process memory and needs to be written to persistent storage. In operation, during a suspend operation, a unique identifier and file metadata (e.g., offset and length information) of the first file—but not the second file—is communicated to the cache engine, and during a resume operation, file data of the first file is retrieved from the cache engine based on the unique identifier and file metadata. Advantageously, storing and retrieving the first file based on the unique identifier, file metadata, and the cache index can reduce a total amount of storage that needs to be reserved for suspend operations and resume operations to be executed successfully.

In addition, the host machine provides the cache engine having the cache index, the cache index supports storing a first file associated with a first application and a second file associated with a second application. The first file may be at least one file of a plurality of files that support the first application, and the second file may be at least one file of a plurality of files that support the second application. The cache engine uses a first unique identifier for a single instance first file for both the first virtual machine and the second virtual machine, and a second unique identifier for a single instance of the second file for both the first virtual machine and the second virtual machine. The first virtual machine can be associated with a first user accessing a first virtual desktop running the first application, such as, a word processing application, the word processing application runs based on the first file. The second virtual machine can be associated with a second user accessing a second virtual desktop running the second application, such as, a spreadsheet application, the spreadsheet application runs based on the second file. The first virtual machine may also be associated with the second application and the second virtual machine may also be associated with the first application.

Moreover, the host machine and a virtual machine can operate to provide desktop virtualizations services based on virtualization operations (e.g., activate, suspend, or resume). The host machine includes the cache engine and a cache index of a plurality of application files—each having a unique identifier—that support running an application on the virtual machine. The cache engine includes an application maintenance manager (e.g., a maintenance micro-service) that phases out non-supported applications (e.g., application files or binaries) and introduces new applications into the cache index and introduces new binaries. For example, a consumption of the available cache in the cache engine can be balanced based on popular operating system binaries and application binaries using in-use counters associated with the list of supported applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1A:
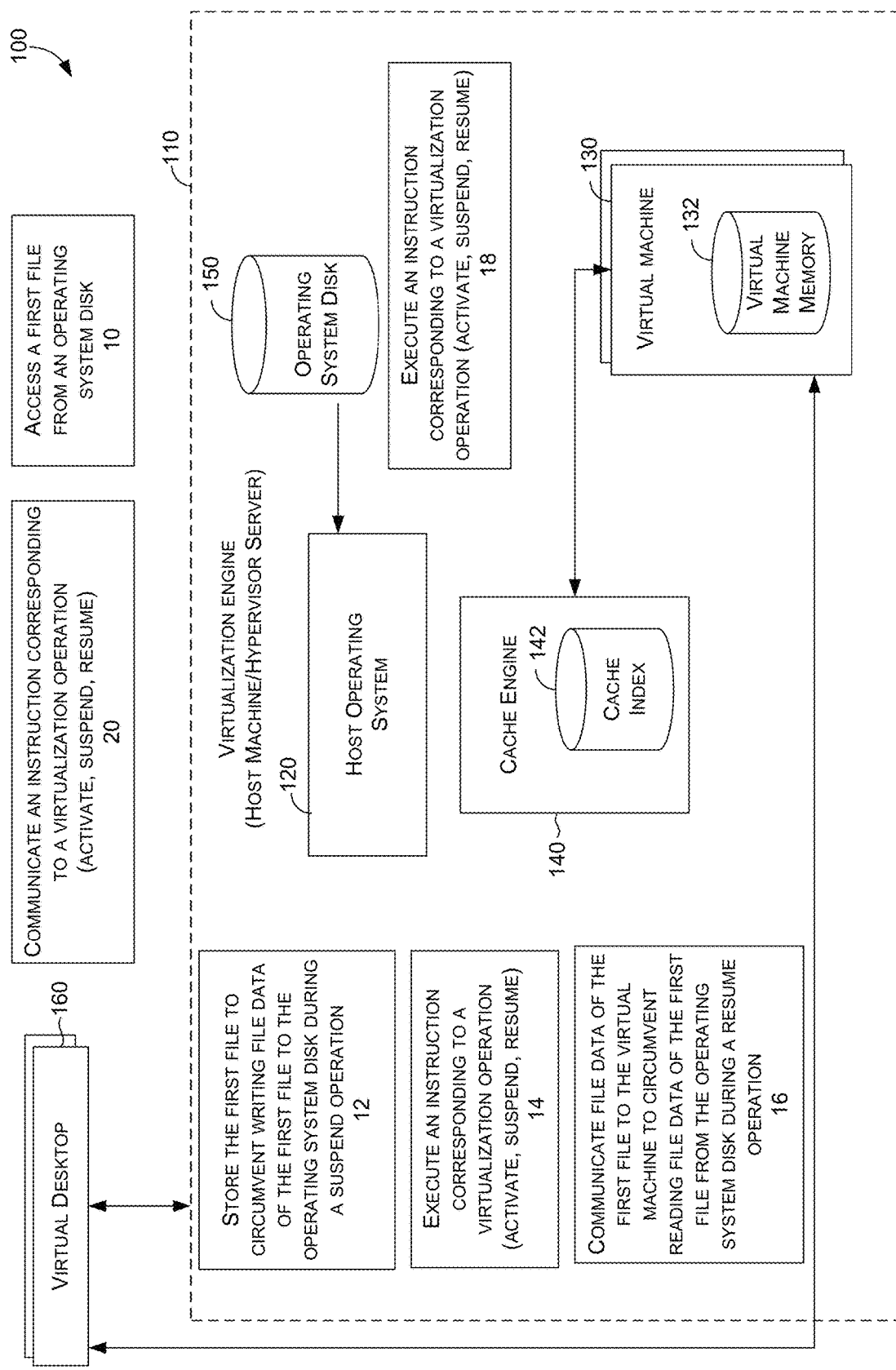
FIG. 1A is a block diagram of an exemplary virtualization system environment for providing virtualization operations using a virtualization engine in a virtualization system, in accordance with aspects of the technology described herein.

Overview of Technical Problems, Technical Solutions, and Technological Improvements Cloud computing provides on-demand computing resources (e.g., network, compute, and storage) based on shared resources. A customer of a cloud computing platform may pay for a particular cloud computing service model (e.g., service-oriented architecture) in exchange for using distributed computing resources of a cloud computing platform. The cloud computing platform can provide different deployment models that define how to access to shared resources on the cloud computing platform. For example, a cloud computing platform provider may support desktop virtualization—or Desktop-as-a-Service ("DaaS"). Desktop virtualization technology supports providing a comprehensive desktop environment for a highly flexible and secure desktop delivery model. Desktop virtualization (e.g., a virtualization system) can simply be for delivery of applications and services on a cloud computing platform—specifically managing different desktop instances (e.g., adding new applications and services to the desktop deployment model). Virtualization system management ideally should provide, at scale, the type of user experience that end-users have come to expect from traditional desktops, while further providing greater flexibility to work from anywhere, any device, and collaborate more easily.

Conventionally, virtualization systems are not configured with computing logic for shared virtualization services for delivering virtual environments in cloud computing platforms. Computing logic for shared virtualization services for delivering virtual environments in cloud computing platforms has not been implemented because of the challenges in developing an efficient virtualization management system—that adequately addresses the scope of virtualization management operations needed—to balance performance associated with desktop virtualization with computing resource cost of always running virtual machines associated with desktop virtualization. In a classic deployment model, customer workloads are different and end-users computing devices simply access individual application sessions, where the application is running on a virtual machine that supports a plurality of end-user computing devices.

In addition, with conventional desktop virtualization, a virtual machine can be kept switched off or in suspend state to save on computing resources in the cloud computing platform; however, the end-user experience can be diminished if the virtual machine start-up time is slow. For example, files of a virtual machine of a virtual desktop are retrieved from remote storage that is not on a host machine of the virtual machine—thus delaying the ability to access computing resources. Managing virtual machines that do not operate in a classic deployment model, and that have slow start-up times, exposes limitations in the capacity of conventional systems to manage virtual machines—especially in the DaaS context. For example, a virtual machine—associated with a virtual desktop—is implemented with a classic deployment model primarily designed for traditional customer workloads and configurations does not adequately address functionality needed to support virtual machines to ensure adequate performance of virtual desktop environments. As such, a more comprehensive virtualization system—with an alternative basis for performing virtualization operations—can improve computing operations and interfaces for virtualization systems in cloud computing platforms.

Embodiments of the present disclosure are directed to providing virtualization operations—including an activate operation, suspend operation, and resume operation for virtualization management in a virtualization system. A virtualization operation is an operation that is executed to accomplish a particular task (e.g., activate, suspend, or resume) associated with a virtual machine. An activate operation, suspend operation, or resume operation is executed for a virtual machine based on a cache engine. The cache engine manages (e.g., stores and communicates) a first file of an application running the virtual machine. Managing the first file and the file data helps circumvent writing file data of the first file to an operating system disk during a suspend operation of the virtual machine and helps circumvent reading file data of the first file from the operating system disk during a resume operation of the virtual machine. The first file is maintained in the cache engine as a single instance of the first file that is accessible by a plurality of virtual machines (i.e., guest virtual machines) associated with a host machine. The first file is retrieved from an operating system disk and stored in the cache engine using a unique identifier and cache index. The unique identifier and cache index support performing virtualization operations. The cache index includes a plurality of application files (e.g., application files of different types of applications in an operating system disk) that are managed when the applications are running on the virtual machine or a plurality of other virtual machines.

Figure 1B:
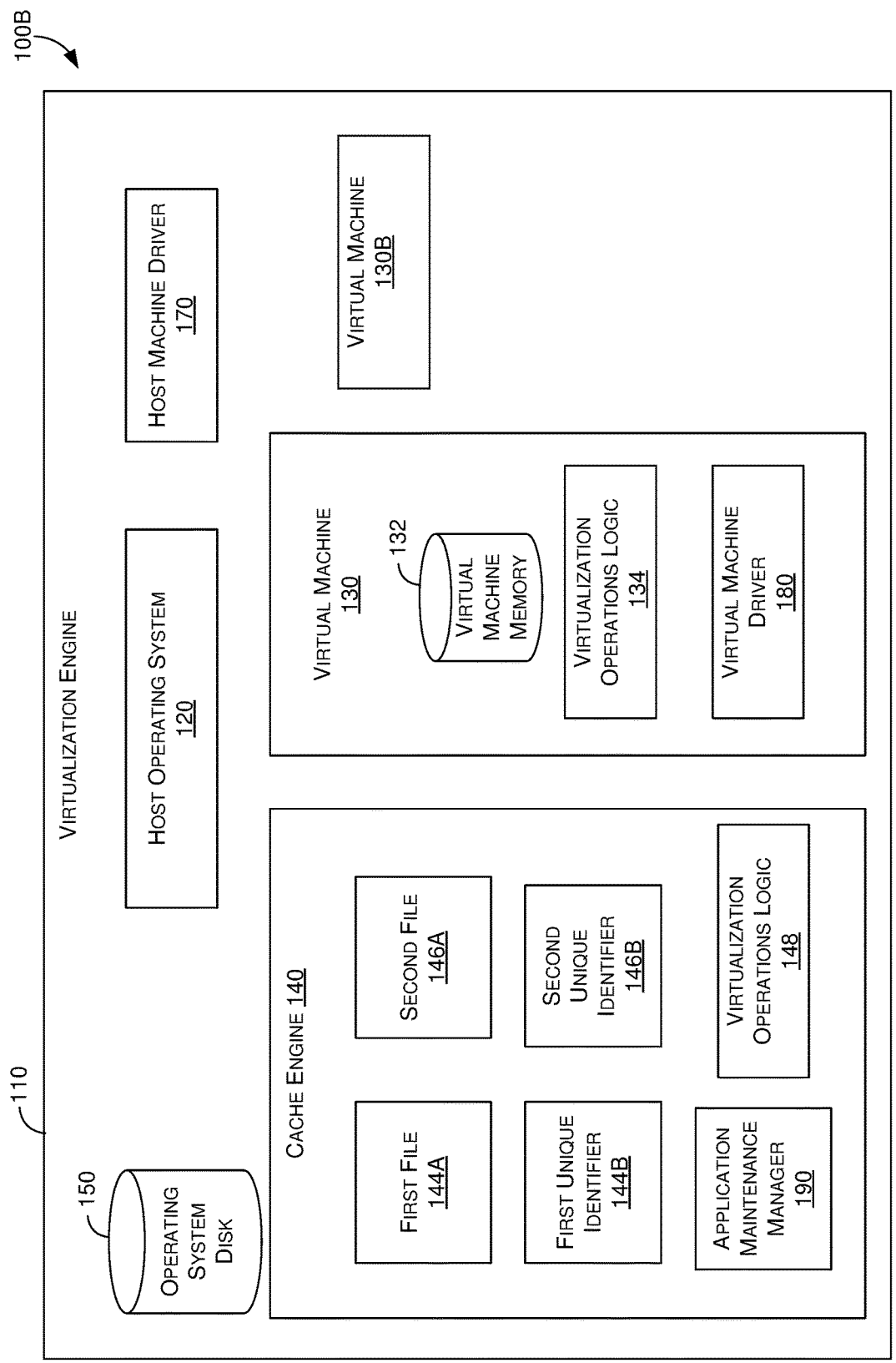
FIG. 1B is a block diagram of an exemplary virtualization system environment for providing virtualization operations using a virtualization engine in a virtualization system, in accordance with aspects of the technology described herein.

Aspects of the technical solution can be described by way of examples and with reference to FIG. 1A and FIG. 1B. FIG. 1A illustrates a virtualization system 100 having a virtualization engine 110, a host operating system 120, a virtual machine 130 having a virtual machine store 132, a cache engine 140 having a cache index 142, an operating system disk 150, and virtual desktop 160.

The virtualization system 100 provides virtualization operations for virtual systems. The virtualization system 100 includes a cache engine (e.g., cache engine 140) that operates with a host operating system and virtual machines (e.g., host operating system 120 and virtual machine 130) to support performing virtualization operations that provide the functionality described herein. The host operating system, and virtual machines include computing logic and instructions that complement and supplement the cache engine computing logic and instructions of virtualization engine 110 for providing virtualization operations. For example, virtualization engine 110 can perform virtualization operations associated with a cache index (e.g., cache index 142) and provide activate, suspend, and resume operations, as described herein.

The virtualization system 100 provides a balance to the overall cost of providing DaaS. The improved balance provides an end-user with application performance benefits while keeping the computing resources cost of maintaining the virtual desktop lower than the cost in conventional virtualization systems. For example, a virtual machine may be kept in switched off or in suspended state to save on running cost to the virtualization system, and, the virtualization engine 110 provides virtualization operations (i.e., activate, suspend, and resume operations) that are faster than conventional virtualization systems based on a computing logic that includes a cache engine having a cache index, and a host server that maintains the cache engine.

At a high level, a cloud computing provider has knowledge of a limited set of applications (e.g., application program or operating system programs)—such as popular operating systems and popular application programs—that are deployed in a particular geographic regions supported via the distributed computing environment of the cloud computing provider. The applications may be read-only files or binaries. The application files (e.g., a first file and a second file) are accessed. The application files of a plurality of other applications can also be accessed. The operating system disk 150 is remote from a computing node (not shown) that is running the host operating system 120.

With reference to FIG. 1B, FIG. 1B illustrates a virtualization system 100B that corresponds the virtualization system 100B, the virtualization system includes virtualization engine 110, host operating system 120, virtual machine 130 having virtual machine memory 132, virtualization operations logic 134, and virtual machine 130B, cache engine 140 having first file 144A and first unique identifier 144B, second file 146A and second unique identifier 146B, virtualization operations logic 148, host machine driver 170, and application maintenance manager 190. At a high level, a virtualization engine (e.g., hypervisor server or host machine) stores in a cache engine 140 application files (e.g., first file 144A and second file 146A) with corresponding identifiers (e.g., first unique identifier 144B and second unique identifier 146B). The applications files can be read-only files or binaries for guest virtual machine (e.g. virtual machine 130 and virtual machine 130B) operating systems or applications.

The application files can be single instances of a read-only file or binary irrespective of how many instances of the guest virtual machine instances may be in use. For example, if a file 'System32.exe' that belongs to Windows OS version X.Y, and there exists three different guest virtual machines running Windows OS version X.Y, a single copy of the file System32.exe is in the cache engine 140 (e.g., hypervisor cache). Each guest virtual machine OS access operation for this file will read data for the file from the cache engine. Moreover, the virtual machine can be associated with a filter driver (e.g., virtual machine driver 180) that intercepts a read request for the unique identifier and file metadata, the filter driver communicates with a host driver (e.g., host machine driver 170) of the host machine to access the file data of the first file in the cache engine.

Virtualization operations logic 148 in the cache engine 140 and virtualization operations logic 134 in the virtual machine 130 provide support for performing virtualization operation in accordance with embodiments described herein. For example, during a guest virtual machine (VM) suspend operation, the guest VM operating system writes to the cache engine 140 a unique id of each read-only file or binary along with information about relevant offset and length combinations—portions of the files—that were currently in use by the guest VM that is being suspended. Because the cache engine 140 is present on a virtualization engine 110, data that belongs to any file that is part of the cache engine 140 does not need to be written to the operating system disk as part of the suspend operation. Only the unique identifier of the file along with offset and length information will provide enough information for the resume operation to fetch the data from the local cache engine 140. And, for the guest VM resume operation, the guest VM accesses from the cache engine 140—based on the unique identifier and the information about relevant offset/length combinations—portions of the files that were previously in use by the guest VM that was being suspended.

With reference to FIG. 1A, initially, at block 10, the host operating system 120 accesses a first file of an application from an operating system disk 150 of a host machine (e.g., hypervisor server). At block 12, the host operating system 120 stores the first file with a first unique identifier to support circumventing writing file data of the first file to the operating system disk during a suspend operation. The host operating system 120 operates with the cache engine 140 that includes a cache index 142. At block 14, the host operating system 120 is configured to execute an instruction corresponding to a virtualization operation (e.g., activate, suspend, resume) associated with the first file, as discussed in more detail herein. At block 16, the host operating system 120, via the cache engine, communicates file data of the first file to the virtual machine to circumvent reading the file data of the first file from the operating system disk during a resume operation.

By way of illustration, the host operating system 120 includes computing logic to manage the application files and make use of the cache engine 140. For example, the host operating system 120 (e.g., hypervisor) supports caching the application files as read-only files, where the implementation includes a lookup table for files with unique identifiers. The cache engine 140 operates as a data store for application files and supports operations for accessing the application files. The host operating system 120 stores application files and corresponding unique identifiers in the cache index 142.

During a suspend operation or resume operation, a guest virtual machine (e.g., virtual machine 130) can make use of locally cached files in the cache index instead of accessing read-only files from the operating system disk 150. The cache index 142 can be used to circumvent reading from the operating system disk 150. For example, during a suspend operation, some percentage of files or executables (e.g., the first file and not the second file) are stored in virtual memory (i.e., virtual machine) as part of running process memory. These files must be written out to persistent storage. By using the cache engine as a local cache, the computing logic writes a unique identifier of a file (e.g., a first file). The unique identifier can be written along with file metadata of the file (e.g., relevant offset/length combination (portions of files) that are currently in use). For a resume operation, communicates a first file based on previously receiving the first unique identifier during a suspend operation. In particular, the computing logic supports accessing the unique identifier and file metadata—compact information—and reads the needed portion of the file from the cache engine 140 via the cache index. In this way, the computing logic circumvents reading the from the operating system disk 150.

Advantageously, reading from the cache engine 140 cuts down the time taken by the suspend operation or resume operation as write operations are no longer needed and read operations from persistent storage (i.e., application store) will only be local cache reads from the cache engine 140. Using the current computing logic cuts down the amount of storage that needs to be reserved for the suspend operations and resume operations to complete successfully, and results in overall storage cost reduction.

At block 18, the virtual machine 130 executes an instruction corresponding to a virtualization operation associated with the first file or the second file. At a high level, a guest virtual machine—via a guest OS—can include computing logic for a suspend operation or a resume operation to identify a list of files needed from the cache engine 142 (e.g., using checksums) and utilize the cache index 142 in the host operating system instead of reading from the OS disk (i.e., operating system disk 150) which may be available only over the network due to the nature of the cloud hosting model. At block 20, the virtual desktop 160, communicates an instruction corresponding to a virtualization operation. For example, the virtual desktop may trigger an activate operation, suspend operation, or resume operation to cause the virtual machine to perform the activate operation, suspend operation, or resume operation, as described herein.

The cache engine 140 can support maintenance operations for the locally cached files. For example, maintenance can be performed per-server cache that phases out non-supported binaries and introduces new binaries into the caching target file list as new operating systems and application versions roll out. The cache consumption (e.g., a predefined size allocated for storage) of the cache engine can also be balanced based on most popular operating system and application binaries. An example computing logic for this can be based on keeping an in-use counter associated with the list of supported operating systems and applications. Other variations and combinations of methodologies for tracking applications to trigger phasing out applications from the cache engine are contemplated with embodiments of the present disclosure.

Embodiments of the present disclosure include providing support for virtualization operations. Conventional virtualization systems can be based on predictive suspend or resume algorithms as a micro-service. Unfortunately, these algorithms cannot be accurate due to presence of roaming users and shifting PC use patterns during mass scale events like regional events, holiday seasons, work-from-anywhere-anytime scenarios etc. In contrast, with embodiments described herein, the caching model for OS and popular application binaries on host machines—via host operating system, cache engine, cache index—speeds up resume operations or suspend operations for virtual machines hosted on the host machines under different types of scenarios including those that cannot be identified by the predictive algorithms. Operationally, the caching model further improves end-user experience of getting access to their virtual desktops. Moreover, the current caching model compliments the pre-existing mechanisms, thus further saving on the potential delay of fetching the minimum needed binaries without incurring any network or disk related delays. The cache can be populated during host machine (e.g., hypervisor server) start to be available for any VM suspend or resume that happens later.

Figure 2A:
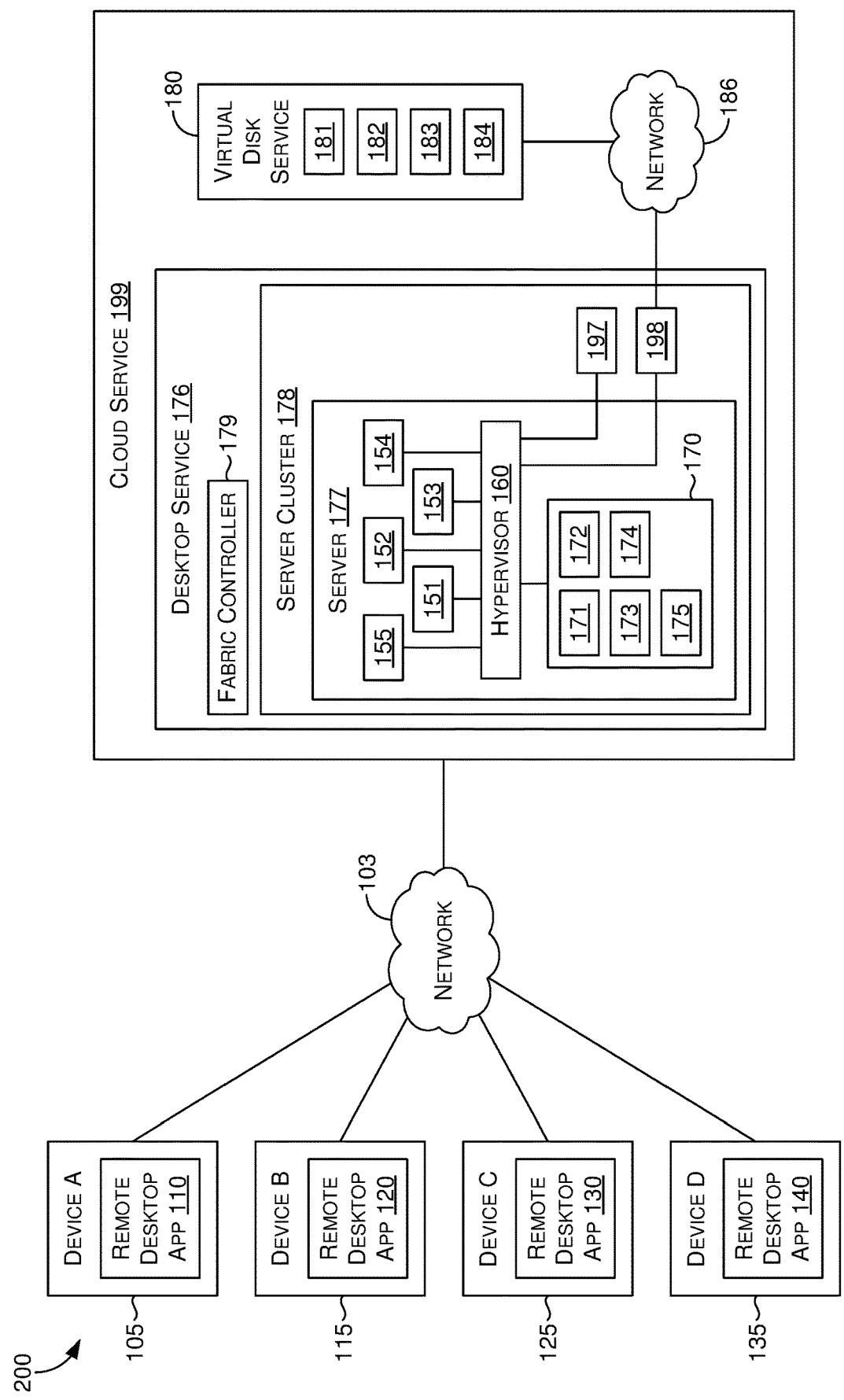
FIGS. 2A-2D are illustrations of an exemplary virtualization system environment for providing virtualization operations using a virtualization engine in a virtualization system, in accordance with aspects of the technology described herein.

Overview of Exemplary Environments for Providing Virtualization Operations in a Virtualization System Aspects of the technical solution can be described by way of examples and with reference to FIG. 2A, FIG. 2B, FIG. 2C, FIG. 2D and FIGS. 3-6. FIG. 2A is a block diagram of an exemplary technical solution environment, based on example environments described with reference to FIGS. 7 and 8 for use in implementing embodiments of the technical solution are shown. Generally the technical solution environment includes a technical solution system suitable for providing the example virtualization system 100 in which methods of the present disclosure may be employed. In particular, FIG. 2A shows a high level architecture of the virtualization system 100 in accordance with implementations of the present disclosure. Among other engines, managers, generators, selectors, or components not shown (collectively referred to herein as "components"), the technical solution environment of virtualization system 100.

With reference to FIG. 2A, FIG. 2A is an example system 200—that corresponds to virtualization system 100 in FIG. 1A—for providing virtualization operations in accordance with embodiments of the present disclosure. By way of example, a cache (e.g., a consolidated cache) with a cache item—for example, a single instance of a file (e.g., a resource, resource data. or resource file) for executing an application or operating system—is stored in a cache. A cache can be associated with a root partition (e.g., root partition cache) or a host operating system (e.g. a hypervisor cache). The file is assigned a unique identifier for managing the file via the cache. A child virtual machine can then cause the identifier associated with the file to be stored in the cache—for example, a virtual disk root partition—rather than storing the file (e.g., content of the file) on the child virtual disk (e.g., a virtual disk of a child partition associated with the child virtual machine). This approach of storing the identifier via the child virtual machine has benefits for cache efficiency, ease of installation and enhanced security.

In an embodiment, a resource that is cached is a read-only resource that is accessed by several different child virtual machines. For example, a resource file for a child partition, such as system32.exe, supports executing the child operating system of the child partition. The resource file that is stored in the cache may be shared between child virtual machines. For example, three different child machines use the same child operating system, and so each of the child virtual machines requests the same system32.exe, but only one copy is maintained by the cache in the host partition. The child virtual machines run based on correspond guesting operating systems. Each guest operating system communicates an access request for the resource file and reads data for the resource file from a root partition cache, or from a hypervisor cache.

A resource file is assigned a unique identifier that is used for operations associated with the resource file. The unique identifier of the resource file is written to disk associated with the cache. The unique identifier identifies the particular resource. In some instances, the unique identifier identifies a portion of the resource file based on an offset and length pair. The offset and length pair are written to disk in combination with a portion of memory (e.g. a portion that was in use when a virtual machine was suspended). The resource file is part of the cache does not need to be written to the disk as part of the suspend. Only the unique identifier of the file along with, perhaps an offset/length combination provides enough information to resume or to fetch the data of the resource file from the cache.

During a resume operation associated with a guest virtual machine (VM), the guest VM accesses a resource file— (i.e., resource file data corresponding to the resource file) from cache a resource file and accesses other files that are not in the cache for a virtual disk corresponding to the virtual machine. More specifically, a read from the virtual disk reads the written unique identifier of resource file that is stored in the cache. The read may further access relevant information (e.g., offset/length pair) that specifies a portion of the resource file that was previously in use by a guest virtual machine that was being suspended.

Turning to FIG. 2A, an example virtualization system 100 shows a cloud service 199 providing a desktop service 176 with virtual disk service 180. The virtualization system supports an activation operation, suspend operation, or resume operation that executed for a child machine based on a cache.

With reference to an activation operation, an activation request—corresponding to the activation operation—is communicated from remote desktop app 120 of device B 115. The activation request is a desktop service request that is communicated to the fabric controller 179. The fabric controller 179 access and analyzes service requests (e.g., the activation request) from remote desktop applications (e.g., remote desktop application 110, 120, 130, 140) and identifies child machine (e.g., child virtual machines or child machines 151, 152, 153 and 154) for executing the service requests. The fabric controller can specifically assign a child machine to a physical server (e.g., server cluster 178). In the example shown, a physical server (i.e., server 177) running host operating system 155 operates the child machines 151, 152, 153 and 154.

A user of an access device 115, making use of an access device user interface, launches a desktop service to be displayed in a display area of access device 115 through remote desktop app 120. A request to launch a desktop service is sent from remote desktop app 120 to desktop service 179. Fabric controller 179 assigns the child machine (e.g., activating instance of child machine OS 152) to server 177. Desktop service 176 launches on server 177 the child machine OS 152 which is stored in physical memory partition 172, making use of virtual disk drive 182.

Hypervisor 160 provides a virtualized display adapter output that is sent to remote desktop App 120 for display in a display area of device 115. Similarly a user operates access device 125 interacting with a user interface of remote desktop app 130, operates with virtual disk 183 child machine 153 with corresponding physical memory partition 173. Child machine 153 causes a display area of remote desktop app 130 to show the output of child operating system 153. Additionally, a user operating access device 135 interacts with the user interface of remote desktop app 140, operates with virtual disk 184 child machine 154 with corresponding physical memory partition 174. Child machine 154 causes a display area of remote desktop app 140 to show the output of child operating system 154.

Cloud service 199 may be for example, a datacenter, a hybrid cloud, a private cloud, a public cloud, Amazon Web Services, Microsoft® Azure, IBM Smartcloud, Oracle cloud, Google Compute Engine, etc. Child machine OS 151 may be for example Microsoft Windows® OS, Mac OS X, Chrome OS, Linux, BSD, Unix, OS/2, etc. Remote desktop app 110 may be any access device application with access to the desktop service, for example a client application, a thin client application, or a browser such as an HTML5 web client.

By way of example, the desktop service 176 provides different grades of service to the user based on the capabilities provided for the virtualized child OS 152. For example, 5 tiers of grade of service. One tier of a grade service, for example, provides an amount of available memory, a number of physical cores, a processor speed, and an amount of available disk storage. The present technology has the advantage of providing a greater amount of available memory for each user, and apparently responds more quickly (higher disk efficiency, and higher perceived processor speed). In an embodiment fabric controller 179 chooses a server 177 that matches the tier of service that accommodates a user's purchased grade of service. In another example, the fabric controller 179 aggregates child machine 151 and child machine 152 onto server 177 because the customers have purchased a similar grade of service. In another example, the fabric controller 179 also aggregates child machines 151, 152 and 153 onto server 177 because each supports an operating system or an application with a common component.

In an embodiment, a component described herein is local rather than being provided by a cloud service. In an embodiment server 177 is operative to perform the operations disclosed herein when server 177 is a virtual machine server running on a local computer with one or more physically attached local displays. Hypervisor 160 in an embodiment provides physical access to one or more local displays provided to virtual machines 151, 152, 153, 154, and 155. In an embodiment, the number of local displays is at least as large as the number of operating child virtual machines, thus providing multi-user local access. In an embodiment disk partitions 181, 182, 183 and 184 reside on local disk 197.

Figure 2B:
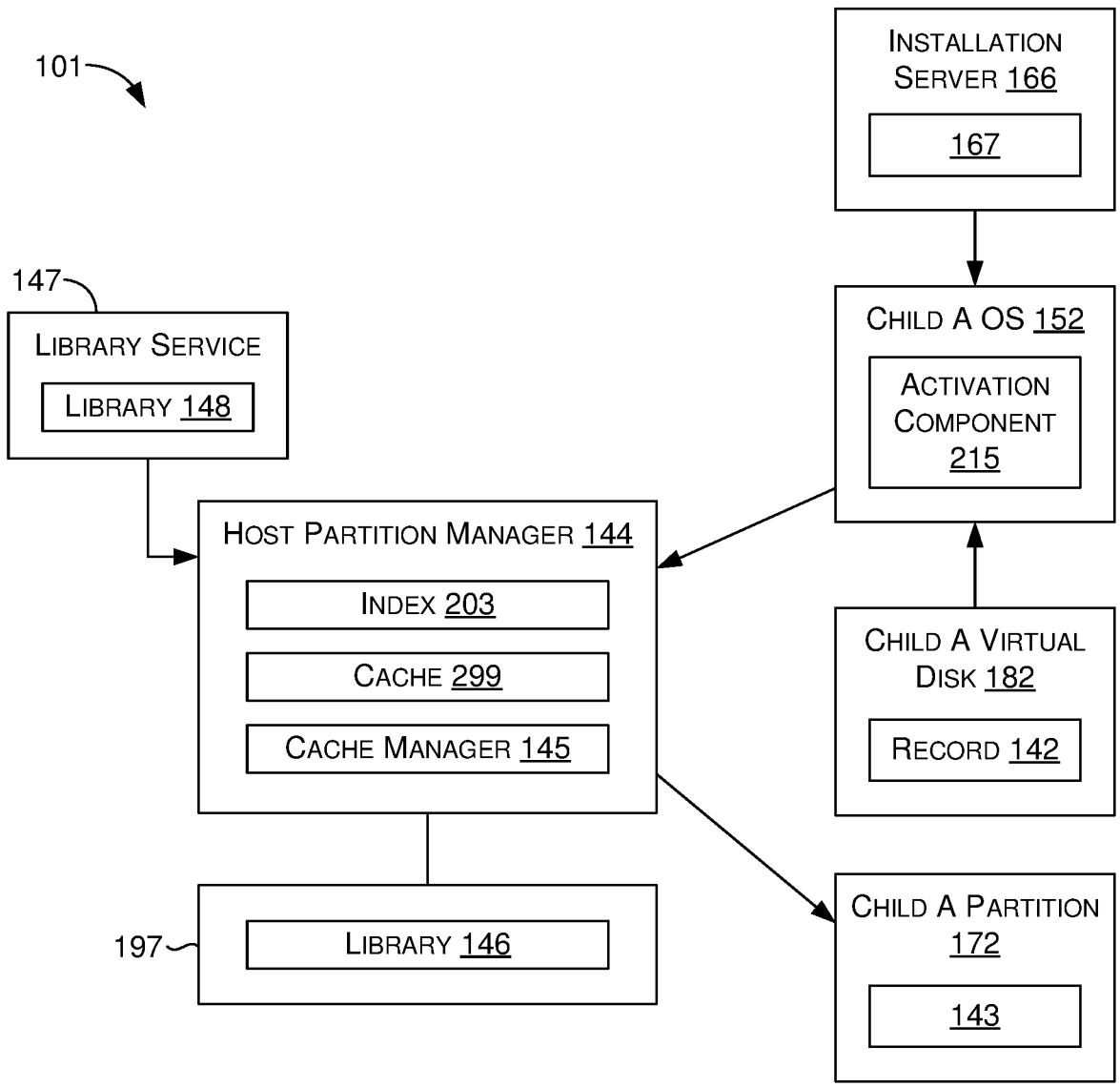

Turning to FIG. 2B, activation diagram 101 shows a computer implemented system providing a method for activating content. Activating content generally provides placing into an active memory partition 172 a portion 143 of a content file, or resource file that is operable on a child machine 152. A resource file may be an operating system resource such as Windows system file, smss.exe, lsass.exe, etc. A resource file can also be a productivity application such as a calculator, word processor, an antivirus program or browser, e.g. Calculator.exe, wordpad.exe, mcshield.exe, chrome.exe, etc. Some applications routinely launch several instances of resource files, so several copies of the same resource, or portions of the same resource could also be active in memory.

Content may generally be activated as part of a resume process, an installation process, or a startup process. An activation structure 142 is generally a storage record that is used in activation. An activation structure may therefore be a resume structure, an installation structure, or a startup structure. A resume structure may generally be a hibernation file for an operating system child instance such as hiberfil.sys. A resume structure may be recorded in a linked list. For example, a resume structure may contain a header containing a memory image header, a processor state and a sequence of linked table pages with corresponding content or identifiers. A resume structure may be organized as a single contiguous content record with a header defining memory image and processor state. A resume structure may be a collection of structures that work together to record system state.

For the purpose of illustration, a sequential resume structure is, for example, a storage record that contains a sequence of one or more resource segment structures that form a segment list. Metadata associated with the sequential resume structure defines a portion of a resource associated with each segment. Each segment structure corresponds to a portion of content to be activated from a resource file. A segment structure may contain either a resource identifier or a segment of serialized content from a corresponding resource. A segment structure generally records information necessary to activate a portion of a corresponding resource. A segment structure may include a resource identifier. A segment structure may include an integer defining an offset from the beginning of a resource, and an integer defining length of the portion drawn from the resource. An integer may reflect a portion of memory such as a memory page, or an amount of storage, e.g. in kilobytes (kB) for counting memory content. In an embodiment a segment structure contains a resource identifier when it is the first segment, or when a prior segment referred to a different resource, but a subsequent segment that pertain to the same resource does not again record a resource identifier in the segment structure. A resource list is generally a list of resources that each corresponds to a segment structure.

Figure 2C:
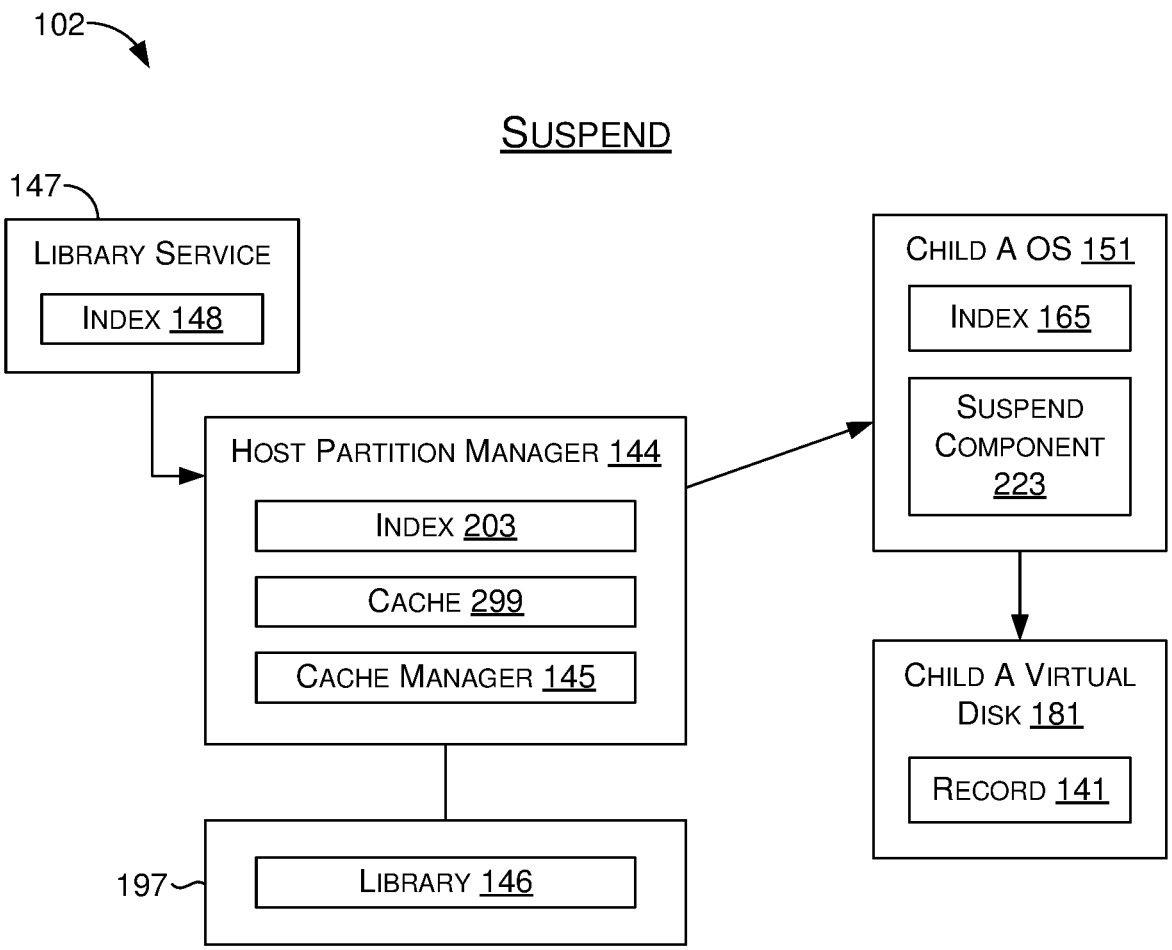
Figure 2D:
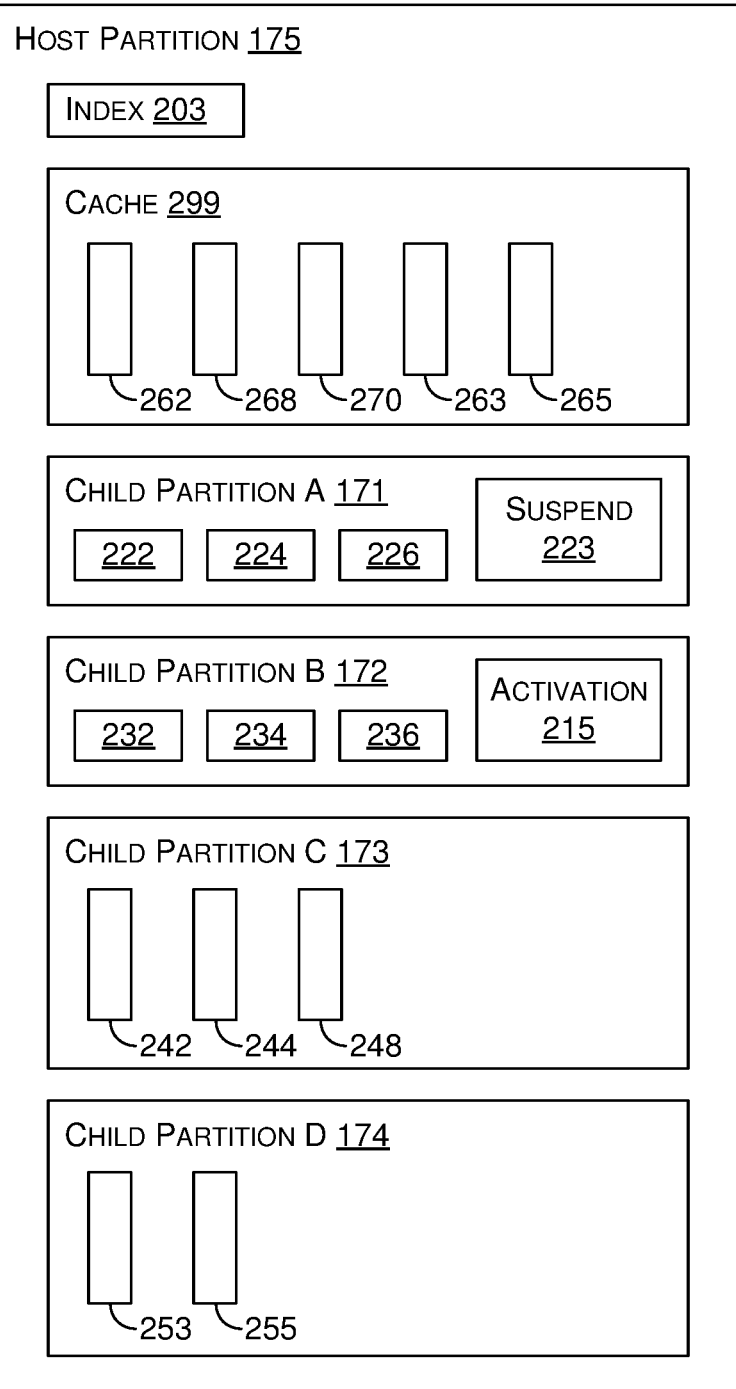

An example illustrates the operation of the activation system 101 of FIG. 2B operating in conjunction with the physical memory contents illustrated in memory map 200 of FIG. 2D. A sequential resume structure is stored in activation record 142, and has three segment structures for three resources that were running at the time of suspend: lsass.exe, wordpad.exe and mcshield.exe. A first segment structure contains a resource identifier for lsass.exe, such as F1 hex (F1h), together with an "offset/length" for the portion of the resource file lsass.exe that was running in memory, e.g. "4/8." The second segment structure records the executable for wordpad.exe that was active in memory at the time of shutdown. The third segment structure records the resource identifier for mcshield.exe, such as F2h. Child machine 152 is instantiated by server 177, and activation component 215 runs within child machine 152.

The activation operation further includes the activation component 215 accessing record 142 stored on virtual disk 182 for child partition 172 and for child machine 152. In an embodiment, the record 142 is a memory image record. Activation component 215 reads the activation record 142 into active memory for the activation process. Activation component 215 receives at child machine 152 the sequential resume structure from record 142 which includes the three segment structures. For example, activation component 215 receives the first segment structure that contains the identifier F1h, and an offset/length of 4/8 from the sequential resume structure that was stored in record 142. The identifier F1h identifies the resource file lsass.exe which is operable on child machine 152. Activation component 215 sends a request that includes the identifier F1h and the offset/length 4/8 to cache manager 145 which is associated with host partition 175.

Cache manager 145 manages a cache 299. Cache manager 145, looks up the identifier F1h in manager index 203 and locates the corresponding resource file in cache memory portion 262, and from cache 299, cache manager 145 obtains the portion of resource file lsass.exe at offset/length 4/8. Cache manager 145 copies the data at memory portion 262 located at offset/length 4/8 into the child partition 172. Child partition 152 receives the portion of the resource file lsass.exe into active memory portion 232. The lsass.exe process has been activated for child machine 152.

Figure 6:
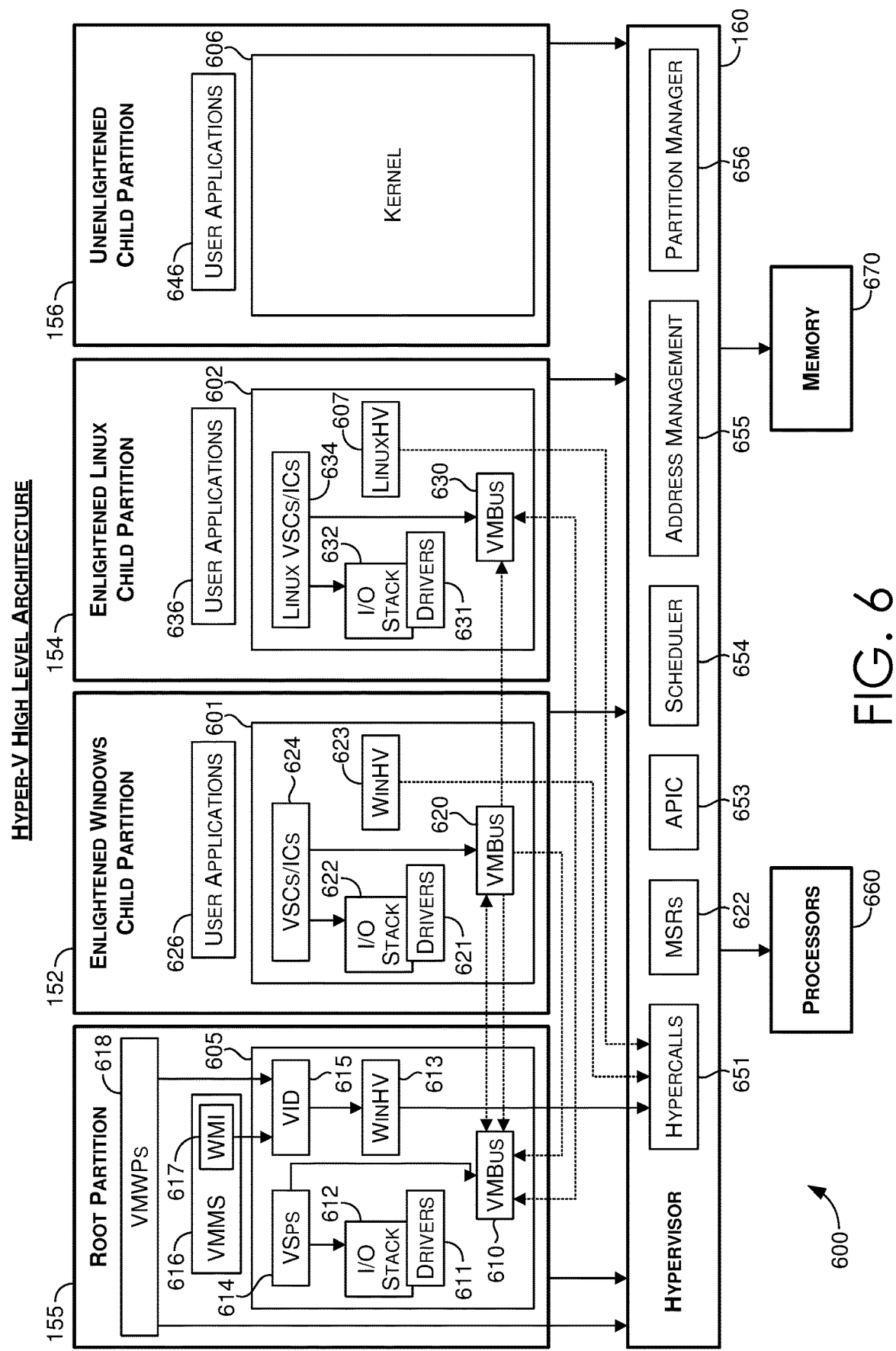
FIG. 6 provides a block diagram of an exemplary virtualization system environment suitable for use in implementing aspects of the technology described herein.

Turning to FIG. 6, system 600 illustrates an embodiment of activation component 215 that communicates with the cache manager 145 using Hyper-V Data Exchange Service (KPV) to provide communication of an identifier, e.g. F2h. In an embodiment, a nonintrusive implementation makes use of KPV. During resume a child virtual machine filter driver intercepts the read requests for a unique identifier of a cached file with a specified offset and length and uses the data exchange service to fetch corresponding data from the hypervisor cache by interacting with the host driver which is cache aware. During activation, child Machine 152, driver 621 intercepts a read request of a third segment structure that includes identifier F2h, and Virtualization Service Client 624 requests via VMEbus interface 620 in child machine 152 to VMEbus interface 610, a resource identified by F2h. Drivers 611 in the host machine 155 performs a memory transfer of the content in cache item 266 to memory portion 236. Child partition 152 operates with user applications 626 and kernel space 611. In kernel space 611, Virtualization Service Client/Integration Component 624 communicates I/O requests through I/O stack 622 to drivers 621.

Host partition 155 operates a user mode component of the virtualization stack Virtual Machine Worker Processes 618. A Virtual Machine Management Service 616 manages the state of the virtual machines in child partitions using a Virtual Machine Management Service that exposes a set of Windows Management Instrumentation-based APIs 617 for managing and controlling virtual machines. The Virtual Machine Management Service 616 provides partition management through Virtualization Infrastructure Driver 615. Windows Hypervisor Interface Library 613 in the host machine 155 bridges partition operating system drivers through hypercalls 651 to Windows Hypervisor Interface Library 623 in child machine 152. Hypervisor 160 provides a virtualization layer between partitioned execution environments using Memory Service Routines 622, Advanced Programmable Interrupt Controller 653, Scheduler 654, Address management 655 and partition manager 656. Partitions 155, 152, 154 and 156 gain access through hypervisor 160 to commonly accessed processors 660 and memory 670. Unenlightened partition 156 operates with user application space 646 and kernel space 606. Linux partition 154 operates with user applications 636 and kernel space 602. LinuxHv 607 performs a bridge between partitioned Linux machine 154 and root partition 155.

During activation, Linux partition 154 communicates a resource identifier to root partition 155 to obtain a Linux binary. For example, in child Machine 154, driver 631 intercepts a read request of a segment structure that includes an identifier for emacs such as 3Fh, and Virtualization Service Client 634 requests via VMEbus interface 630 in child machine 154 to VMEbus interface 610, a resource identified by 3Fh. Drivers 611 in the host machine 155 perform a memory transfer of the content in cache item 263 to memory portion 253. In kernel space 602, Linux Virtualization Service Client/Integration Component 634 communicates I/O requests through I/O stack 632 to drivers 631.

In an embodiment, changes are made to hypervisor 160 to make use of cache 299. The implementation in an embodiment is as simple as providing a small look aside table for index 145. Such an index in an embodiment is added to the hypervisor with file unique identifiers or checksums. A child machine 151 has enhanced suspend component 223 and enhanced resume component 215. In an embodiment suspend component 223 and/or resume component 215 identifies a list of needed files by their checksums and are able to use the index 203 in a root partition 175 or in a hypervisor 160 instead of attempting to read from virtual disk 181 which may be available only over the network 186. The host machine and a child machine can communicate through existing data exchange API.

In an embodiment, during a child machine resume operation 215, a child machine 152 accesses from hypervisor cache 299 a resource file in cache such as a binary read-only file, and accesses from a virtual disk 182 a writeable binary file. A child machine reads from disk 182 the unique identifier of a resource and portion information such as oan offset/length combination. A child machine filter driver intercepts a read request for the unique identifier of a cached read-only file and perhaps offset/length information, and uses a KVP service to communicate with a host driver to fetch the corresponding portions of memory from a hypervisor cache 299, and also reads from disk 182 previously written writeable files.

In an embodiment, the cache manager 145, prompted by the request from activation component 215, increments an activation count for the lsass.exe resource in response to the request from activation component 215. This activation count reflects the popularity of the resource file lsass.exe in the system.

In another embodiment, the child partition 152 publishes the segment for lsass.exe to the cache manager 145. Cache manager 145 stores a list of candidate resource files for entrance into cache 299 and indexed by cache index 203.

The activation component 215 gets a next segment structure to activate by reading the second segment structure. The second segment structure contains raw memory data because the second segment structure documents a resource file that is not a read-only resource. In an embodiment the second segment structure contains compressed raw data. In this case the activation component decompresses stored data before placing into active memory. The activation component copies the data from the second segment structure (the executable for wordpad.exe that was active in memory at the time of shutdown) into child partition 172 because the resource file wordpad.exe is not maintained by cache manager 145. Active memory portion 239 receives at the child machine 152 the content of the resource file wordpad.exe that was active in memory at the time of shutdown. In an embodiment, activation component publishes the resource file for a resource retrieved from virtual disk to the cache manager 145, and cache manager 145 increments a count to reflect the popularity of a resource that is not yet in cache 299. In an embodiment cache manager 145 stores the published binary in storage on disk 197 for possibly adding to cache 299 in the future.

The activation component 215 gets a next segment to activate, e.g. by reading a next segment structure from record 142. From the third segment structure of child record 142, activation component 215 receives at the child machine 152 the content identifier F2h, identifying the resource file mcshield.exe. Activation component 215 communicates with the cache manager 145 by sending to the cache manager 145 associated with host partition 175 a request that includes the content identifier F2h. The cache manager 145 manages cache 299 which includes the resource file mcshield.exe in memory portion 266. Cache manager 145 looks up the content identifier F2h in manager index 203 and determines that the identifier refers to the resource file mcshield.exe in cache portion 266. Cache manager 145 copies the memory contained in cache portion 266 to active memory portion 236 in child partition 172. Memory portion 236 in partition 172 receives the content from the memory portion 266.

Cache manager 145 maintains a cache 299 at a host machine 155 that does not include the resource file wordpad.exe, but that does include the resource files lsass.exe and mcshield.exe. Cache manger 145 sends to the child machine 151, and to child machine 152 an index 165 that includes an entry in the index 165 for lsass.exe that includes an identifier F1h, and another entry for the resource file mcsheild.exe that includes the identifier F2h. When child machine 151 sends a request cache manager 145 to activate content indicated by F1h with offset/length 4/8, cache manager 145 receives the child machine 151 request to activate content indicated by F1h with offset/length 4/8. Cache manager 145 determines that lsass.exe is indicated by the identifier F1h and copies the designated portion of the content resource file lsass.exe from memory portion 262 to memory portion 232, and content for lsass.exe is activated. When child machine 151 sends a request to cache manager 145 to activate content indicated by F2h, cache manager 145 receives from child machine 151 a request to activate content indicated by identifier F2h. Cache manager 145 determines that mcshield.exe is indicated by F2h and copies the portion of the content resource file mcshield.exe from memory portion 266 to memory portion 236, and content for mcshield.exe is activated.

In light of this example several advantages of the present technology are evident. Cache 299 is operable to service several child partitions 171, 172, 173, and 174, resulting in storage efficiency. For example, the same resource in cache 262 can be used to service three different child partitions, caching memory portion 222 for partition 171, memory portion 232 for child partition 172, and child partition 242 for child partition 173. In this example, child partitions 171, 172 and 173 all are able to run the same resource represented by cache item 262. An efficiency is gained when more than one child machine needs the same resource, e.g. a resource that is common to compatible versions of an operating system, such as compatible releases of Windows® 10. Cache 299 is able to store fewer copies of cache item 262 than other alternative approaches. Cache manager 145 increments a count of use for the entry lsass.exe when the request that includes identifier F1h is received. Cache manager 145 increments and tracks a count of use for the entry mcshield.exe when the request that includes identifier F2h is received. A count of use for an identifier tracks the popularity of the resource that corresponds to the identifier. The cache manager 145 is also equipped to receive from child machine 153 a request to activate content including an identifier such as F1h also with offset/length 13/16. In response, cache manager 145 copies the portion of lsass.exe beginning at the 13$^{th}$ page, and copies 16 pages of memory from memory portion 262 of host partition 175 into memory portion 242 of child partition 173. In an embodiment, the cache manager 145 determines which resources to maintain in cache 299, in part by ranking the counts that reflect popularity of resources, and providing in cache index 165 the most popular resource as reflected by count. In an embodiment, cache manager 145 provides an index 165 to a child machine 151 for use by a suspend component 223. In an embodiment cache manager 145 provides an incremental update or change to index 165 to child machine 151, and the index 165 is modified to include the incremental update received from cache manager 145. In an embodiment, a request from activation component 215 includes a checksum that uniquely identifies an entry in an index 203.

The present approach may also provide for a more memory efficient activation process. The activation process 215 can use less memory, because for some segments it only requires the memory space of an identifier, and the memory space of cache 299 is used to advantage to decrease the memory requirements of activation component 215 in memory partition 172 shown in FIG. 2D.

Additionally, in the disclosed technology a separate, and non-compatible child virtual machine 154 such as a linux virtual machine is able to operate using the same cache 299. A linux child machine 174 might run linux tools like apt, sed, grep, awk, top, tmux and ssh. Linux binaries might include developer tools like Vim, emacs, git and the GNU Debugger (GDB). A linux binary could be a service like sshd, apache, nginx, or MySQL. A linux binary might be a language tool, etc. For example, child partition 174 is running in memory portion 253 text editor emacs, and in memory portion 255 secure shell ssh. The present technology allows cache 299 to store a cached version of emacs editor in cache portion 263, and a cached version of ssh in cache portion 265.

Furthermore, a resource thus activated has the advantage that it is less subject to exploitation. A man-in-the middle attack seeks to corrupt a child machine version or instance of a security resource such as lsass.exe or mcshield.exe. If an activation process had relied upon child virtual disk 182 for raw content, a locally corrupted security resource would be restored to memory when an activation process takes place. But the present technology advantageously restores a resource by an identifier that directs the system to a secure copy of the resource that is safely stored in host cache memory item 262, and so may be more carefully protected than a resource that is stored in child partition virtual disk 182. This is a security benefit. Cache portion 262 provides the security policy for a child machine, and cache portion 266 provides an antivirus scanning program. Such executables are often targeted by exploitation attacks. The approach described allows child machine 153 operating in child partition 173 to make use of cache 299, to activate memory portion 242 that runs lsass.exe, and memory portion 248 that contains a portion of mcshield.exe. Child machine 152 is operable to make use of cache item 262 which stores lsass.exe and cache item 266 which stores mcshield.exe.

In another example, suspend system 102 of FIG. 2C suspends operation of child machine 151 in conjunction with the physical memory contents illustrated in memory map 200 of FIG. 2D. System 102 creates a sequential resume structure to be stored in record 141 of virtual disk 181 for child virtual machine 151. A sequential resume structure may also be referred to as a sequential activation structure, or a sequential suspend structure. Cache manager 145 generates an index 165 of content supported by host system cache 299 for child machine 151. Cache index 165 contains an entry for each content resource available to child machine 151. An index 165 is generally a structure that enables suspend component 223 to determine whether or not an identifier exists in index 165 for a particular resource. Each entry of index 165 contains an identifier of a corresponding resource. Each entry of the index 165 may also include a checksum, or a hash value that allows the entry for a resource in the index to be quickly located. In an embodiment a hash of the resource itself, or a hash of the unique name of the resource produces the hash value which is then used by suspend component 223 to locate the resource identifier corresponding to the resource.

In addition, an entry in the index may include a signature that, when verified, certifies the content of the resource is identical to the original copy of the resource. In addition, an entry in the index may include a region description that describes the portion of the resource that can be loaded from host system cache 299. In an embodiment the index 165 is a subset of index 203 containing those resources that are supported by child machine 151. Cache manager 145 generates index 165 by sending a needed portion of index 203 to suspend component 223. Suspend component 223 receives the index 165 generated by cache manager 145.

System 102 performs a suspend operation which stores the state of child machine 151 in a record 141, in a standard form so that it may be later resumed. A suspension operation may be initiated by fabric controller 176, by host machine 155, by a user selection of a user using device 105, or by an operation of child machine 151. For example, a user of device 105 decides to save the state of a virtual desktop displayed to the user on remote desktop app 110. The user of device 105 selects a suspend graphical control on remote desktop app 110 to suspend operations of child machine 151. Remote desktop app 110 sends a suspend request to child machine 151 via network 103. Child machine 151 launches suspend component 223 which begins performing suspend operations. As part of the suspend operation, suspend component 223 begins dumping to virtual disk 181 the state of all memory prior to the launching of suspend component 223. At the time that the suspend request was received by child machine 151, there were three resources running in memory: a portion of lsass.exe in memory portion 222, calculator.exe running in memory portion 224 and mcshield.exe running in memory portion 226.

Suspend component 223, processes each portion of memory until all memory to be saved is processed. Suspend component 223 processes a portion of memory by obtaining a portion of active memory, determining if the portion appears in the index 165, and storing a segment structure corresponding to the memory portion as a segment structure in record 141. A first portion of memory 222 is obtained by suspend component 223 that corresponds to a portion of the resource lsass.exe from an offset of 4 memory pages from the beginning of the file lsass.exe, and that is 8 pages in length. Suspend component 223 accesses index 165 to determine if the portion of lsass.exe which is being used in memory portion 222 has a corresponding entry in the index 165. Suspend component 223 determines that index 165 has an entry for lsass.exe which includes the corresponding identifier F1h.

Suspend component 223 processes the portion of memory 222 by using the identifier F1h, storing the content identifier F1h together with an "offset/length" combination of "4/8" in a first segment structure in record 141. Suspend component 223 processes the next active memory portion 224 which corresponds to calculator.exe. Suspend component 223 accesses index 165 and determines that there is no corresponding entry present for the resource file calculator.exe. Suspend component 223 stores the content of active memory portion 224 in a second segment structure within record 141. In an embodiment the content of 224 is compressed before storage in record 141 Suspend component 223 processes the next active memory portion 226 which corresponds to mcshield.exe. A third portion, memory portion 226 is obtained by suspend component 223 that corresponds to the resource file mcshield.exe. Suspend component 223 accesses index 165 to determine if mcshield.exe has a corresponding entry in the index 165. Suspend component 223 determines that index 165 has an entry for mcshield.exe which includes the corresponding identifier F2h.

Suspend component 223 processes the portion of memory 222 by using the identifier F2h, storing the content identifier F2h in a third segment structure in record 141. The resume record 141 therefore contains three segments for the three resources that were running in memory at the time of suspend: a first segment structure includes the identifier F1h and an offset/length of 4/8 for lsass.exe which was running in memory portion 222, a second segment structure includes the resource file calculator.exe that was running in memory portion 224 and a third segment structure includes the identifier F2h for the resource mcshield.exe that was running in memory portion 226 at the time that a suspension was requested. Suspend component 223 completes operation, and sends a message to remote desktop App 110 "suspension complete". This message then causes the display "suspension complete" on device 105, and host operating system 155 terminates child machine 151.

System 102 provides several advantages. The suspend operation advantageously depends upon secure cache memory portions 262 and 266, rather than on active memory portions 222 and 226. Thus if child machine memory had been corrupted in either memory portion 222 or memory portion 226, the system would be secured upon suspend. Additionally, the suspend process is more cache efficient, because Child machines 171, 172 and 173 all share the same cache portion 262 for a resource such as lsass.exe. Furthermore, the memory size of the suspend process 223, shown in FIG. 2D requires less memory to run than other technologies.

An activation system 101 illustrated in FIG. 2B can be used to perform a startup activation method. Record 142 contains a startup activation structure. A startup activation structure might be created by recording a sequence of segment structures for applications to be launched at startup. For example, a system administrator configures lsass.exe and mcshield.exe to automatically launch for a child system from cache 299 when a child machine 151 is instantiated, by storing an initialized process state in startup record 142 for lsass.exe and mcshield.exe. Record 142 includes a first segment structure including resource identifier F1h and offset/length 4/8, and a second segment structure including resource identifier F2h. Child machine 152 is configured to read record 142 on startup and to make use of startup record 142 to quickly launch lsass.exe and mcshield.exe with an efficient host cache process. Upon startup activation, component 215 accesses record 142 which in this case is a startup record.

Activation component 215 receives content identifier F1h from the first segment structure of record 142 and sends a request to cache manager 145 that includes identifier F1h and offset length 4/8. Child machine 152 receives in response content of the resource file lsass.exe into memory portion 232. Activation component 215 accesses the second segment structure in record 142 and receives identifier F2h. Activation component 215 sends a request to cache manager 145 that includes F2h. Cache manager 145 receives the request including the resource identifier F2h and looks up the resource identifier F2h in index 203 and determines that this is the identifier for mcshield.exe. In response cache manager 145 copies the binary in memory portion 266 into partition 172. Partition 172 receives the binary for mcshield.exe in memory portion 236. In an embodiment, a copy of memory is achieved by providing an appropriate memory reference, or by redirection, rather than by creating a physical copy.

An activation system 101 illustrated in FIG. 2B can also be used to perform an installation activation method. For example a user of device 115 has selected at installation server 166 a binary to be installed. Record 167 contains an installation structure. An installation structure is for example a structure created including a sequence of segment structures for applications to be executed for installation. Record 167 may be a resource list of necessary components to be available to child machine 152 for a selected application to be installed. For example, an installation server 166 stores a structure with a list of two resources that must be run to perform an installation process at child machine 152, e.g. mcstartup.exe and mcshield.exe. The installation structure in this illustration contains two segment structures, the first corresponding to mcstartup.exe has resource identifier 04h. The second segment structure has resource identifier F2h. Activation component 215 accesses record 167 which includes an installation component list with two content identifiers 04h and F2h.

Activation component 215 receives the content identifier 04h identifying the resource file mcstartup.exe. Activation component 215 communicates the content identifier 04h to cache manager 145. Cache manager 145 looks for identifier 04h in index 203 and detects that the resource is not available in cache 299. Cache manager 145 also consults a library 146 stored on disk 197 to determine if content identifier 04h is available locally in disk 197. Cache manager 145 consults library service 147 to determine if library 148 has content identifier 04h. In an embodiment, cache manager 145 adds the content corresponding to content identifier 04h to cache 299, and updates index 203 and index 165. In the present case, cache manager 145 creates a resource count for content with identifier 04h and increments the count, but determines that the content corresponding to content identifier 04h is not available in cache 299. Cache manager 145 replies to Activation component 215 with a message indicating that the resource is not available.

Activation component 215 sends a request including the identifier 04h to installation server 166 for the resource indicated by identifier 04h. Installation server 166 replies by sending the binary for mcsetup.exe. Activation component 215 receives the content for mcsetup.exe and transfers the content, receiving mcsetup.exe in memory portion 232 of partition 172. In an embodiment, a compressed resource is received and after being decompressed the resource is placed into memory. Activation component 215 receives content identifier F2h for the resource mcshield.exe that is operable in child machine 152. Activation component 152 communicates a request to cache manager 145 that includes the resource identifier F2h. The cache manager looks up the resource identifier F2h in index 203 and finds that the resource is available and located in memory portion 266. Cache manager 145 copies memory portion 266 to partition 172. Partition 172 receives mcshield.exe in memory portion 236. Activation component copies the installed binaries for mcsetup.exe and mcshield.exe onto virtual disk 182. The installation is complete.

In an embodiment, cache manager 145 is incorporated into hypervisor 160. In an embodiment cache manager 145 is incorporated in whole or in part in hardware, e.g. processors 660 and/or memory 670, or 170. Partition manager 144 is generally the component which manages a partition in which cache 299 and/or cache manager 145 resides. In an embodiment partition manager 144 is incorporated into hypervisor 160. In an embodiment the hypervisor has its own partition.

Activation context record of resource files that need to be activated. Resource files are OS resources, application resources. An operating system can have several system resources that need to load. Each system resource can have multiple files. A resource is a file needs to be loaded. Word processing, spreadsheet, collaboration application, legacy application, etc. A record of resources is a sequential list of content and/or content identifiers that provide the content itself, or provide an identifier that allows the child machine to obtain the resource.

Figure 3:
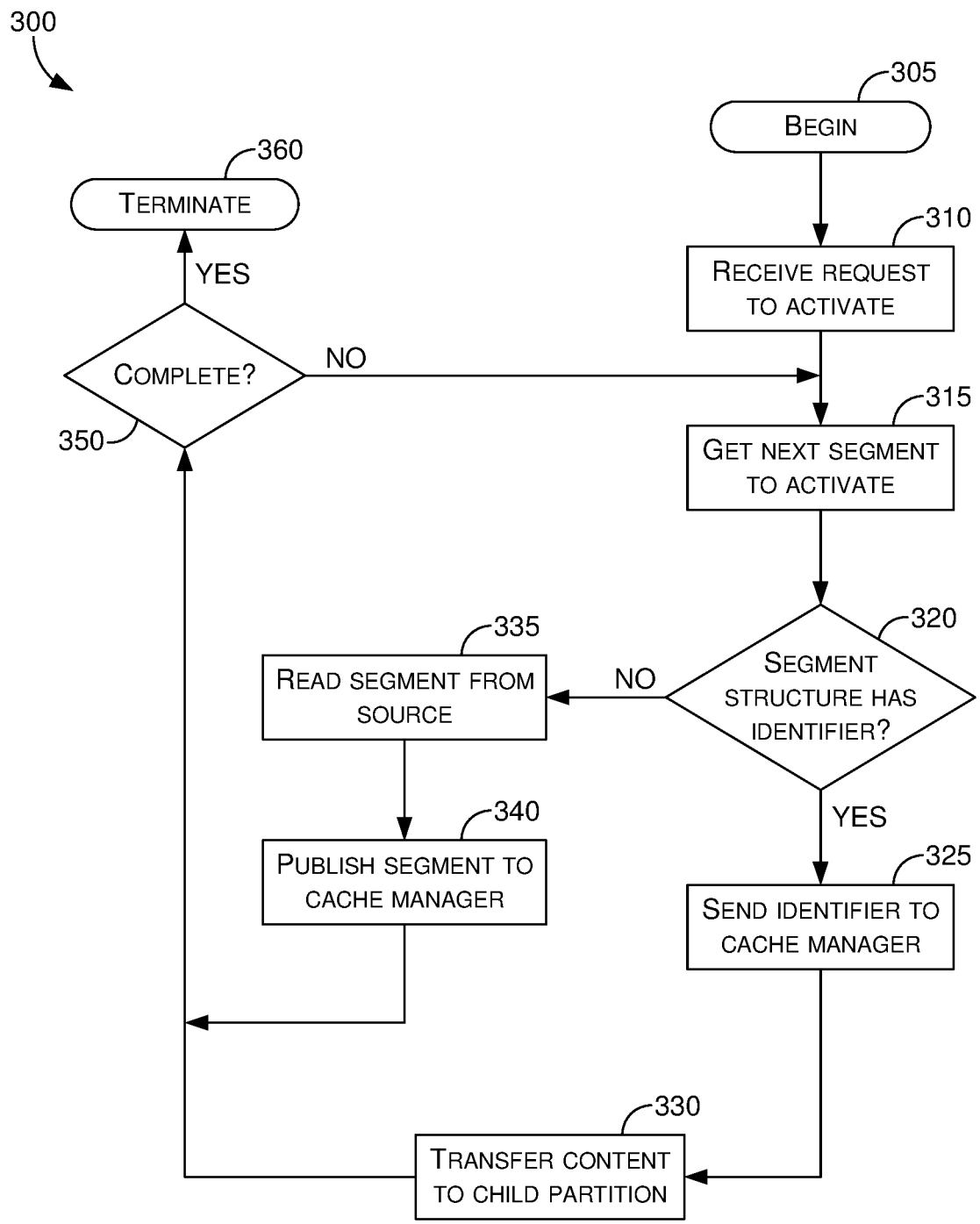
FIG. 3 provides a first exemplary method of providing virtualization operations using a virtualization engine in a virtualization system, in accordance with aspects of the technology described herein.
Figure 4:
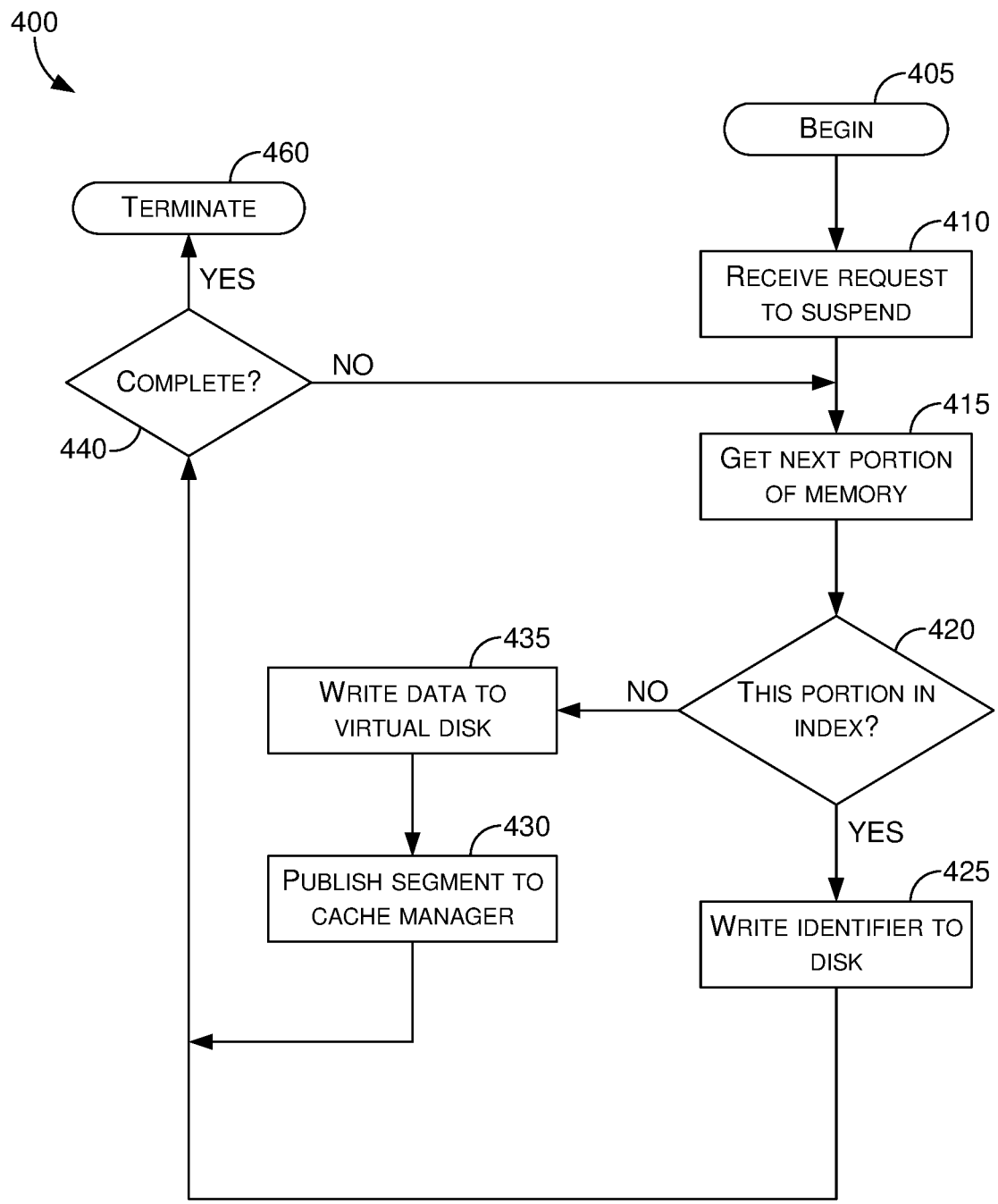
FIG. 4 provides a second exemplary method of providing virtualization operations using a virtualization engine in a virtualization system, in accordance with aspects of the technology described herein.
Figure 5:
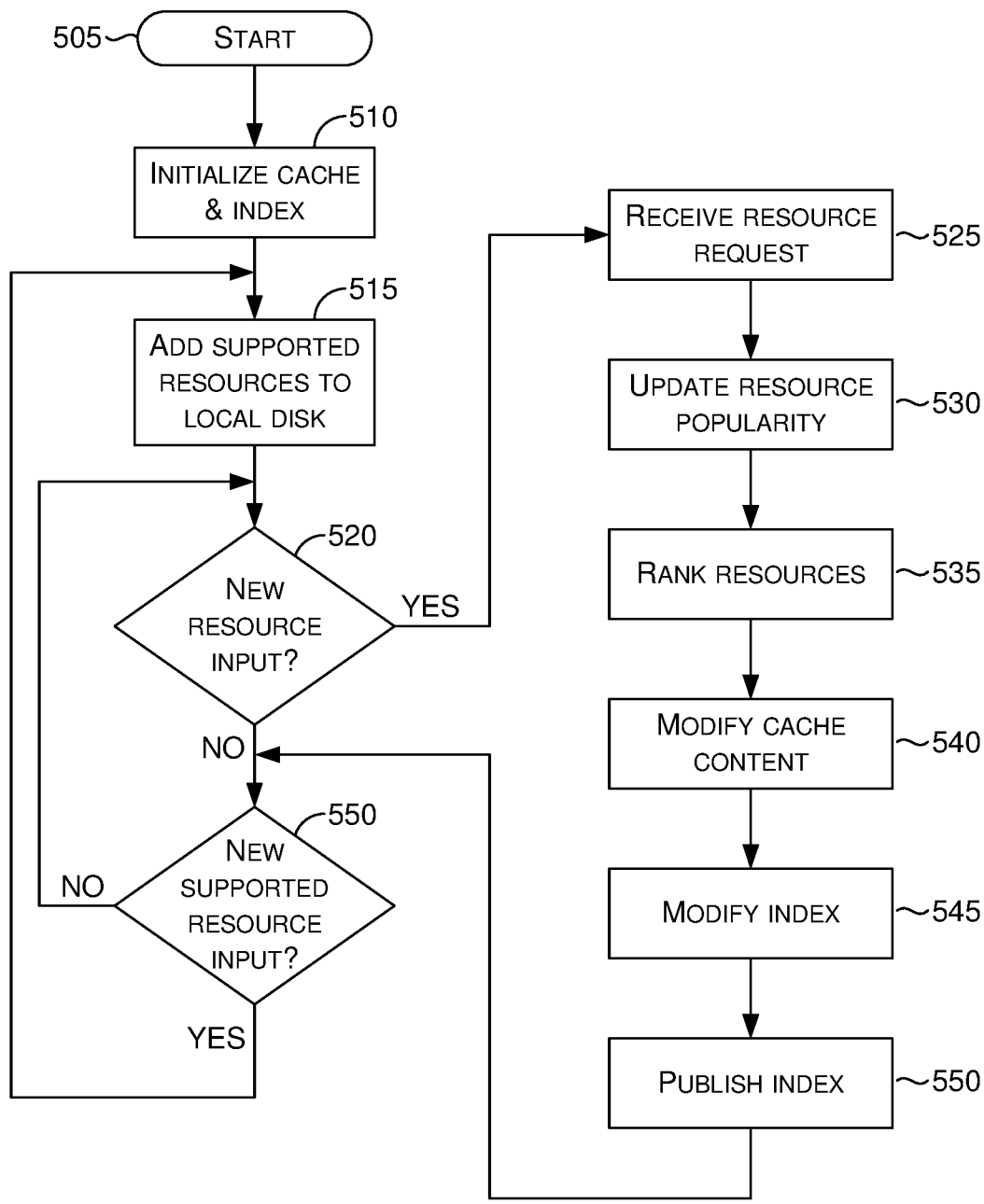
FIG. 5 provides a third exemplary method of providing virtualization operations using a virtualization engine in a virtualization system, in accordance with aspects of the technology described herein.

Exemplary Methods for Providing Virtualization Operations in a Virtualization System With reference to FIGS. 3, 4 and 5, flow diagrams are provided illustrating methods for providing virtualization operations for virtualization management in a virtualization system. The methods may be performed using the virtualization system described herein. In embodiments, one or more computer-storage media having computer-executable or computer-useable instructions embodied thereon that, when executed, by one or more processors can cause the one or more processors to perform the methods (e.g., computer-implemented method) in the virtualization system (e.g., a computerized system or computing system).

Turning to FIG. 3, process flow 300 presents an exemplary method for activation of content, operable in conjunction with system 101 of FIG. 2B. Process flow 300 provides a method of resuming a suspended child machine 152. The state of the suspended machine is stored in virtual disk 182, in a sequential activation structure stored in record 142. At 310 the process waits for a request to activate the suspended machine. In an embodiment, this step of the process is carried out by Cloud service 199 and/or fabric controller 179 and/or host machine 155. For example, Fabric controller 179 receives a request from device 115 to resume a session paused by the user of device 115. Fabric Controller assigns the request to server 177, and child machine instance 152 communicates with remote desktop app 120 to authenticate the user of device 115. In preparation for a valid authentication, child machine 152 begins running activation component 215. The method proceeds to 315 where the first segment structure from record 142 is received by activation component 215, and the method proceeds to 320. At 320 a test is performed to determine if the segment structure has an identifier. In an embodiment, a first portion of the segment structure includes a control field that encodes whether or not the current structure has an identifier. For example, a least significant bit (LSB) of the first byte of data in a segment structure might be encoded with a 1 when an identifier is present, and with a 0 when an identifier is not present. As another example, a header to the sequential activation structure might contain the length of the segments present in the structure, and the length below a certain value would indicate that an identifier is present. When the test at 320 determines that an identifier is present, the method proceeds to 325. At 325, a request including the resource identifier, and also perhaps a description of a portion of the resource to load, such as a list of segments of the resource that are in use, is sent by activation component 215 to cache manager 145. Cache manager 145 receives the request and the identifier in the request is used to determine the cache location by looking up the identifier in cache index 203. Cache index 203 might be, for example, a reverse lookup table that provides a starting memory location as a function of an input index. At 330 the portions of the content described by the request are transferred to the child partition that made the request. A memory portion 232 receives from cache a portion of the resource identified by the resource identifier.

Returning to 320, when the segment structure does not have an identifier, the method proceeds to 335 where the method reads the content from the source of the segment structure into a memory location of the child partition such as memory portion 232. The source used may be a record 142 or a library server 166. In an embodiment, the segment structure is compressed when stored, e.g. in record 142, and the data received from the source is first decompressed before being loaded into a memory portion 232. At 340, the data that is the content of the currently processed segment is published to the cache manager for counting the resource use, and/or for adding the resource to cache 299 by cache manager 145. At 350 a test is performed to determine if the currently processed segment structure was the last in the activation structure, if no the method returns to 315, if yes, the method completes at 360. In an embodiment, the publication of the segments, instead of taking place at 340 is delayed until the process of loading the memory is complete as the process exits 350. The publication of segments is then done as a cleanup process before the method terminates at 360.

Turning to FIG. 4, process flow 400 performs a method for suspending a child virtual machine 151. Beginning at 405, the method proceeds to 420 where a request is received to suspend a child virtual machine 151. At 410 a header portion is created for a sequential resume structure. As part of the suspension, the processes currently running in memory are documented in the sequential resume structure, so that the memory state can be restored when child machine 151 is resumed. The processes that were running in memory are saved portion by portion until all the running processes have been documented so that they may be recovered when the child machine 151 is resumed. At 415 a first portion of memory is obtained. At 420 a test is performed to determine if the process running in the currently processed portion of memory is in the index. This test may involve hashing the name or the content of the resource running in the current portion of memory. Index 165 is checked to see if the process running in the currently processed portion of memory is available in cache 299. If the current portion is in the index, the method proceeds to 425 where an identifier returned from index 165 is written to disk. In an embodiment, the offset/length of the portion of the resource that is running in the currently processed memory portion is also determined, and written to disk with the identifier in the segment structure that corresponds to the currently processed portion of memory. At 420 if the currently processed portion of memory is not in the index, the method proceeds to 435 where the data from the current memory portion is written to disk in a segment structure that stores the content of the portion of active memory for the process that is using the currently processed portion. In an embodiment, the data is compressed before it is written to the current segment structure. At 430 the resource content of the currently processed portion of memory is optionally published to cache manager 145. In an embodiment the entire resource file is published. At 350 the method determines whether or not all active memory has been processed, if not, the method returns to 315. If the process is complet the method terminates at 360.

Turning to FIG. 5, process flow 500 performs a method of managing the content of cache 299. The process begins at 505, e.g. when server 177 is started. At 510, The cache is initialized, e.g. by clearing old data, resetting the index to an empty list, and/or resetting the values to a neutral value. At 515, a list of supported resources is added to disk 197 for use by cache manager 145. In an embodiment a systems analyst determines supported resources, and defines the initial cache contents based on these supported resources. When a limited number of OS resources and popular apps have been planned for deployment, the experience of a user may be enhanced by supporting at least a minimum number of often used resources. As a first step, read-only binaries from a supported set can be added. In an embodiment, a source tree of supported operating system and application resources that are read-only files, or that have read-only portions is added to disk 197 to provide a reference set of clean resources that can be populated into cache 299. In an embodiment, identical files are located by comparing content signatures, and the source tree is pruned to contain only one copy of a resource. An identification table equates a resource from a different machine with a resource already represented in the source tree. In an embodiment, a list of indices is created by grouping supported operating systems together to form a group list, where each group has a reasonable amount of resource overlap between members of the group. In an embodiment, Index 203 forms a separate index for each group. Each child machine in a group receives the same index 165 which is the subset of index 203 for that group of child machines. Cache Manager 145 loads the resources in the supported resource list into cache 299, and builds index 203 to include a resource identifier for each supported resource. In an embodiment, cache manager 145 uses an attribute of a child machine which is known to the cache manager 145 (e.g. machine group), and which is not included in a resource request to select a location of a resource for a child machine. For example, cache manager 145 knows from local memory which group a child machine belongs to. When a resource identifier is received from that child machine, the group is used to select a group table, and a resource identifier is used to select among resources in the resource list for that group. At this point, a static supported binary system is operational.

The method proceeds to 520, where the management process decides whether or not a new resource is input. Such resource inputs can be supported in the management process 500 by the yes branch of 520. If live contributions are not available, or not permitted, the method proceeds to 550 where the process checks for a new supported resource input, such as a modification of a support input file. When there is a new supported resource, or a deletion of a supported resource the method returns to 550 where the new supported resource input is added, and/or a no longer supported resource is deleted. The source tree and the indices are modified to make the supported file change. A change of static supported resource may be made for example, upon reset of server 177, so that cache contents and indices are made at a time when distributed indices cannot be corrupted. An index 145 is distributed at creation of the child machine, and so the problem of a disagreement between index 203 and index 165 is prevented. In an embodiment, at such a time, popularity of resources is taken into account by ranking resources as described at 535, modifying cache content as described at 540, modifying an index as described at 545 and publishing an index as described at 550. Thus the supported OS resources and applications are provided as always available in cache 299, so that there is never a need to read these files from a network virtual disk 181. As an example, the windows OS read-only system files can be a few Gigabytes. Microsoft teams executable can be larger than 9 MB. Every time a suspend operation is done, some percentage of these system files and executables are always in virtual memory as part of the running process memory and they need not be written out to persistent storage, since they will always be available in cache. In an embodiment the maintenance of per-server cache can be controlled by a cloud service 176 micro-service management process. In the micro-service management process, non-supported binaries are phased out, and new binaries are introduced into the caching target file list as new OS versions or new application binaries roll out.

Returning to 520, a process for balancing the cache 299 contents by tracking popularity of resource files is provided. When, at 520, a new resource input is received, such as a resource request, or a publication of a resource to be added the management proceeds to 525. At 525, if the new resource input is the publication of a new suggested resource from a child machine, the method adds the new resource to the source tree on disk 197, and establishes a count for the new resource. If a new resource request has been received that includes an identifier for a request, cache manager 145 obtains the identifier. At 530 the counter is updated for the subject resource. At 535 The resources are ranked for popularity. In an embodiment the ranking occurs only periodically, e.g. every 100 new resource inputs.

At 540, the method determines which resources should be in cache. In an embodiment, all requested resources are added when the cache is below a threshold amount of full. In an embodiment, when the cache is above that threshold amount, only the most popular resources are added. The method checks to see if a resource presently in cache did not make the popularity threshold. If a resource falls below the threshold, the item is flagged for removal from cache. The method then proceeds down the list from most popular to least popular, and adds the resources not currently in cache. After the cache content has been modified at 540, the method modifies the index at 545 and publishes modified index 203 and/or modified index 145. In an embodiment, an index 145 is updated by an update change message that is sent from cache manager 145 to suspend component 223 and to activation component 215. In an embodiment the same component is used for both suspend and resume, so only one message is necessary. When all active child machines have put in use the modified index, cache manager 145 updates index 203, and removes items that were eliminated from cache 299. The publication of the modified cache contents and the modified indices have now been completed, and the method returns to 550. In an embodiment, the modifications to the cache contents and the indices are made the next time that the server 177 has a reset event such as cycling power, or a software reset.

Activation context record of resource files that need to be activated. Resource files are OS resources, application resources. An operating system can have several system resources that need to load. Each system resource can have multiple files. A resource is a file needs to be loaded. Word processing, spreadsheet, collaboration application, legacy application, etc. A record of resources is a sequential list of content and/or content identifiers that provide the content itself, or provide an identifier that allows the child machine to obtain the resource.

Technical Improvement and Literal Support for Claims

Methods, systems, and computer storage media for providing virtualization operations—including an activate operation, suspend operation, and resume operation for virtualization management in a virtualization system. In operation, a cache engine of a host machine—that supports a plurality of virtual machines—receives a unique identifier and file metadata associated with a first file. The first file is stored in the cache engine, the unique identifier and the file metadata correspond to a suspend operation of a virtual machine. Based on a resume operation, the cache engine accesses file data of the first file in the cache engine. The resume operation is associated with the virtual machine, the virtual machine is associated with file metadata previously received for the suspend operation The cache engine then communicates file data to the virtual machine associated with both the suspend operation and the resume operation.

Advantageously, communicating the file data from the cache engine cuts down the time taken by the suspend operation or resume operation as write operations are no longer needed and read operations from persistent storage (i.e., operating system disk) will only be local cache reads from the cache engine. Using the current computing logic cuts down the amount of storage that needs to be reserved for the suspend and resume operations to complete successfully, and results in overall storage cost reduction.

The first file is associated with a first application. The first file is stored in the cache engine as a single instance of a read-only file or binary that is accessible via the plurality of virtual machines associated with the host machine. The file metadata indicates an offset and length information that corresponds to the file data of the first file. An instance of the file data was previously in use on the virtual machine prior to the suspend operation. Accessing file data of the first file in the cache engine circumvents reading the file data from an operating system disk of the host machine. The virtual machine is associated with a filter driver that intercepts a read request for the unique identifier and file metadata, the filter driver communicates with a host driver of the host machine to access the file data of the first file in the cache engine. The host machine further includes an application maintenance manager that phases out non-supported applications in a plurality of applications associated with files that are stored in the cache engine.

Example Distributed Computing System Environment

Figure 7:
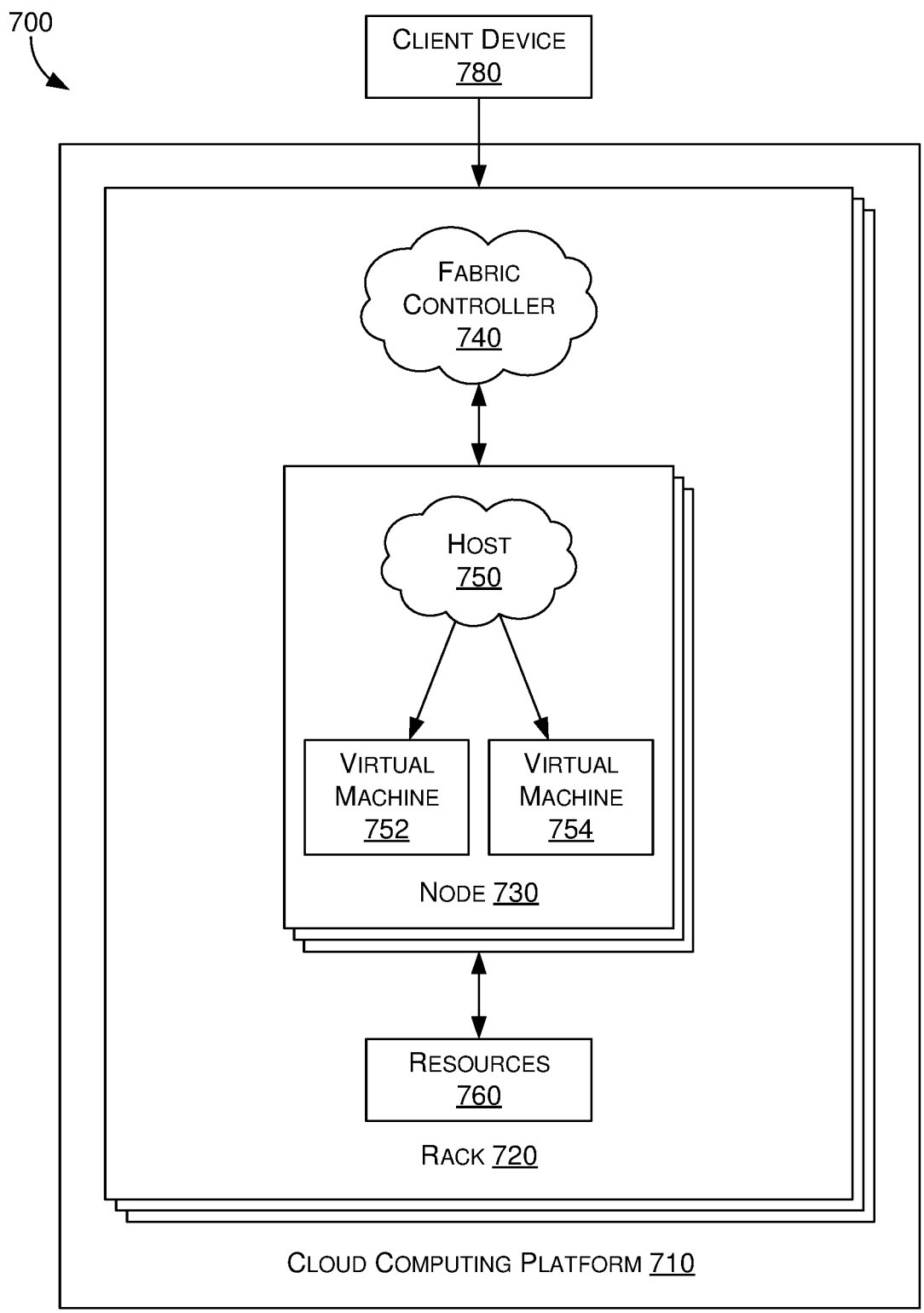
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Computing Device

Figure 8:
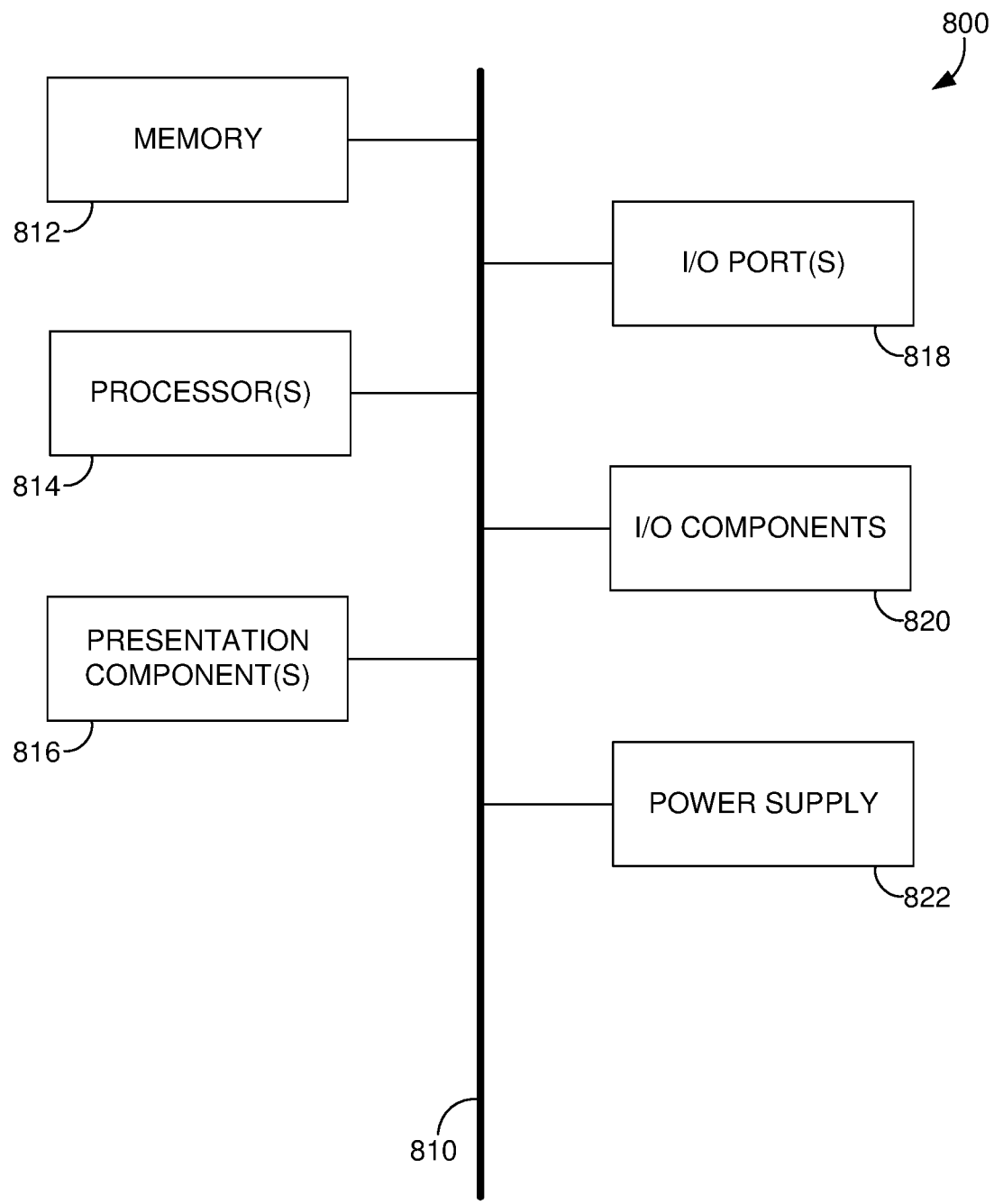
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, the method comprising:
   receiving, at a cache engine hosted on a host machine and associated with a plurality of virtual machines, a unique identifier and file metadata associated with a first file stored in the cache engine, the unique identifier and the file metadata correspond to a suspend operation of a virtual machine, wherein the first file is associated with a first application or a first operating system, and wherein the first file is stored in the cache engine as a single instance that is shared by the plurality of virtual machines associated with the host machine;
   based on the file metadata and a resume operation associated with the virtual machine, accessing, via the cache engine, file data of the first file; and
   using the cache engine, communicating the file data to the virtual machine associated with the suspend operation and the resume operation.

2. The method of claim 1, wherein the first file is stored as a read-only file or binary that is accessible via the plurality of virtual machines associated with the host machine.

3. The method of claim 1, wherein the file metadata indicates an offset and length information that corresponds to the file data of the first file.

4. The method of claim 1, wherein an instance of the file data was previously in use on the virtual machine prior to the suspend operation.

5. The method of claim 1, wherein the virtual machine is associated with a filter driver configured to intercept a read request for the unique identifier and file metadata, the filter driver is configured to communicate with a host driver of the host machine to access the file data of the first file in the cache engine.

6. The method of claim 1, wherein receiving the unique identifier and file metadata at the cache engine circumvents writing the file data to an operating system disk of the host machine of the virtual machine; and
   wherein accessing file data of the first file in the cache engine circumvents reading the file data from the operating system disk of the host machine of the virtual machine.

7. The method of claim 1, wherein the host machine further includes an application maintenance manager that is configured to phase out non-supported applications in a plurality of applications associated with files that are stored in the cache engine.

8. One or more computer-storage media having computer-executable instructions embodied thereon that, when executed by a computing system having a processor and memory, cause the processor to:
   receive, at a cache engine hosted on a host machine and associated with a plurality of virtual machines, a unique identifier and file metadata associated with a first file stored in the cache engine, the unique identifier and the file metadata correspond to a suspend operation of a virtual machine, wherein the first file is associated with a first application or a first operating system, and wherein the first file is stored in the cache engine as a single instance that is shared by the plurality of virtual machines associated with the host machine;
   based on the file metadata and a resume operation associated with the virtual machine, access, via the cache engine, file data of the first file; and
   using the cache engine, communicate the file data to the virtual machine associated with the suspend operation and the resume operation.

9. The media of claim 8, wherein the first file is stored as a read-only file or binary that is accessible via the plurality of virtual machines associated with the host machine.

10. The media of claim 8, wherein the file metadata indicates an offset and length information that corresponds to the file data of the first file.

11. The media of claim 8, wherein an instance of the file data was previously in use on the virtual machine prior to the suspend operation.

12. The media of claim 8, wherein the virtual machine is associated with a filter driver configured to intercept a read request for the unique identifier and file metadata, the filter driver is configured to communicate with a host driver of the host machine to access the file data of the first file in the cache engine.

13. The media of claim 8, wherein receiving the unique identifier and file metadata at the cache engine circumvents writing the file data to an operating system disk of the host machine of the virtual machine; and wherein accessing file data of the first file in the cache engine circumvents reading the file data from the operating system disk of the host machine of the virtual machine.

14. The media of claim 8, wherein the host machine further includes an application maintenance manager that is configured to phase out non-supported applications in a plurality of applications associated with files that are stored in the cache engine.

15. A computerized system comprising:
one or more computer processors; and
computer memory storing computer-useable instructions that, when used by the one or more computer processors, cause the one or more computer processors to perform operations comprising:
receiving, at a cache engine hosted on a host machine and associated with a plurality of virtual machines, a unique identifier and file metadata associated with a first file stored in the cache engine, the unique identifier and the file metadata correspond to a suspend operation of a virtual machine, wherein the first file is associated with a first application or a first operating system, and wherein the first file is stored in the cache engine as a single instance that is shared by the plurality of virtual machines associated with the host machine;
based on the file metadata and a resume operation associated with the virtual machine, accessing, via the cache engine, file data of the first file; and
using the cache engine, communicating the file data to the virtual machine associated with the suspend operation and the resume operation.

16. The system of claim 15, wherein the first file is stored as a read-only file or binary that is accessible via the plurality of virtual machines associated with the host machine.

17. The system of claim 15, wherein the file metadata indicates an offset and length information that corresponds to the file data of the first file.

18. The system of claim 15, wherein an instance of the file data was previously in use on the virtual machine prior to the suspend operation.

19. The system of claim 15, wherein the virtual machine is associated with a filter driver configured to intercept a read request for the unique identifier and file metadata, the filter driver is configured to communicate with a host driver of the host machine to access the file data of the first file in the cache engine.

20. The system of claim 15, wherein receiving the unique identifier and file metadata at the cache engine circumvents writing the file data to an operating system disk of the host machine of the virtual machine; and
wherein accessing file data of the first file in the cache engine circumvents reading the file data from the operating system disk of the host machine of the virtual machine.

* * * * *